(12) United States Patent
Wang et al.

(10) Patent No.: US 9,565,702 B2
(45) Date of Patent: Feb. 7, 2017

(54) DESYNCHRONIZED NETWORK ACCESS IN M2M NETWORKS

(71) Applicant: InterDigital Patent Holdings, Inc., Wilmington, DE (US)

(72) Inventors: Lei Wang, San Diego, CA (US); Ronald Murias, Calgary (CA); Dale N. Seed, Allentown, PA (US); Marian Rudolf, Montreal (CA); Eldad M. Zeira, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/626,835

(22) Filed: Feb. 19, 2015

(65) Prior Publication Data

US 2015/0163831 A1    Jun. 11, 2015

Related U.S. Application Data

(63) Continuation of application No. 13/415,987, filed on Mar. 9, 2012, now Pat. No. 9,002,393.

(60) Provisional application No. 61/450,864, filed on Mar. 9, 2011, provisional application No. 61/485,396, filed on May 12, 2011, provisional application No. 61/508,206, filed on Jul. 15, 2011.

(51) Int. Cl.
| | | |
|---|---|---|
| *H04W 74/08* | (2009.01) | |
| *H04W 4/00* | (2009.01) | |
| *H04W 74/04* | (2009.01) | |
| *H04W 28/04* | (2009.01) | |
| *H04W 56/00* | (2009.01) | |

(52) U.S. Cl.
CPC ......... *H04W 74/0833* (2013.01); *H04W 4/005* (2013.01); *H04W 74/04* (2013.01); *H04W 28/044* (2013.01); *H04W 56/00* (2013.01)

(58) Field of Classification Search
None
See application file for complete search history.

(56) References Cited

U.S. PATENT DOCUMENTS

| | | | |
|---|---|---|---|
| 5,741,314 A | 4/1998 | Daly et al. | |
| 8,315,214 B2 | 11/2012 | Womack et al. | |
| 2008/0267105 A1* | 10/2008 | Wang | H04W 52/0225 370/311 |
| 2008/0287149 A1* | 11/2008 | Womack | H04W 76/048 455/466 |

* cited by examiner

*Primary Examiner* — Anh Ngoc Nguyen
(74) *Attorney, Agent, or Firm* — Condo Roccia Koptiw LLP

(57) ABSTRACT

Systems, methods, and instrumentalities are disclosed to desynchronize transmissions in group-based operations. A group user equipment (UE), e.g., a UE that is a member of a group of UEs, may be in an inactive mode. The group UE may receive a multicast message indicating that the group UE may enter an active mode. For example, the group UE may use the active mode for periodic reporting of its monitoring activity to the network. The multicast message may indicate a mechanism for the group UE to use to send an uplink transmission to the network. The group UE may send the uplink transmission to the network at a transmission time indicated by the mechanism. The transmission time may be desynchronized from other UEs in the group.

22 Claims, 11 Drawing Sheets

| Parameter | Offset to Master-a | Offset to Master-b |
|---|---|---|
| Time | $\Delta t_{i,a}$ | $\Delta t_{i,b}$ |
| Power | $\Delta p_{i,a}$ | $\Delta p_{i,b}$ |
| Frequency | $\Delta f_{i,a}$ | $\Delta f_{i,b}$ |

FIG. 4

| Field | Size (bits) | Value/Description | Condition |
|---|---|---|---|
| ...... | | | |
| for (i=0; i < Num_MGID; i++) { | | Num_MGID indicates the number of MGIDs included in this paging message | Shall be included if the group paging is supported in the AAI-PAG-ADV message. |
| MGID | 15 | M2M Group ID | |
| Action code | 1 | 0b0: Perform the network reentry<br>0b1: Performs ranging for location update | |
| If (Action Code == 1) { | | | |
| Multicast transmission start time (MTST) | TBD | Least significant TBD bits of the frame number in which the ABS starts sending DL multicast data. | Shall be present when the MTST needs to be included in this message. |
| } | | | |
| If (Action Code == 0b0) { | | | |
| Network reentry assistances | TBD | information field(s) for bursty network reentry handling for the group of subscribers being paged. | Present when group paging with network reentry is used. |
| } | | | |
| ...... | ...... | ...... | |
| } | | | |

FIG. 5

DESYNCHRONIZED NETWORK ACCESS IN M2M NETWORKS

CROSS-REFERENCE TO RELATED APPLICATIONS

This application is a continuation of pending U.S. patent application Ser. No. 13/415,987, filed Mar. 9, 2012, which claims the benefit of U.S. Provisional Patent Application No. 61/450,864, filed on Mar. 9, 2011, U.S. Provisional Patent Application No. 61/485,396, filed on May 12, 2011, and U.S. Provisional Patent Application No. 61/508,206, filed on Jul. 15, 2011. U.S. patent application Ser. No. 13/415,987, U.S. Provisional Patent Application No. 61/450,864, U.S. Provisional Patent Application No. 61/485,396, and U.S. Provisional Patent Application No. 61/508,206 are incorporated herein by reference in their entireties.

BACKGROUND

A communication system for Machine-to-Machine (M2M) applications, for example an Internet of Things (IoT), may refer to communications between two or among multiple entities that do not necessarily need any direct human intervention. It is a fast emerging market. M2M applications may cover a very wide range of use cases. For example, M2M applications may cover health care, smart metering, industrial remote maintenance and control, tracking, tracing and recovery, secured access and surveillance, public safety, consumer devices, retail, payment, home and/or building automation, etc. In an exemplary use case, M2M applications may have large numbers of devices. Currently, there are many problems in efficiently managing M2M devices and their communications.

SUMMARY OF THE INVENTION

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Systems, methods, and instrumentalities are disclosed to desynchronize UE transmissions, e.g., in group-based operations. A user equipment (UE), e.g., a group UE that is a member of a group of UEs, may be in an inactive mode. An inactive mode may relate to an idle mode in systems such as HSPA, LTE, 802.11, WiMAX, and the like. The UE may determine a mechanism for the UE to use to send an uplink transmission to a network, for example when entering an active mode (e.g., a mode where uplink transmissions to the network may be sent) from an inactive mode. For example, the UE may use the active mode for periodic reporting of its monitoring activity to the network. The UE may send the uplink transmission to the network at a transmission time indicated by the mechanism. The transmission time may be desynchronized from other UEs, for example other UEs in a group comprising the UE (e.g., the group may be UEs associated with a particular base station). The desynchronized transmission time of the UE may be spaced apart from transmission times associated with the other UEs.

The mechanism may comprise the UE setting the transmission time to a time indicated in a multicast message received from a base station. For example, the base station may perform phase calculations based on one or more of reporting periodicity, delay tolerance, available system time, etc. The base station may perform the phase calculations for a plurality of UEs, e.g., the group of UEs. The base station may calculate phases (e.g., transmission opportunity times) to distribute uplink transmissions of UEs throughout available resources (e.g., transmission opportunity times, channels, etc.). The base station may use the phase calculations to provide the time to the UE. The base station may provide a mapping to the UE and/or members of the group, that maps the UE and/or members of the group to a time (e.g., transmission opportunity). The time may provide the UE and/or members of the group with contention free access to the network.

The mechanism may comprise the UE or a base station determining a transmission window. The transmission time may be within the transmission window. The transmission window may be determined based on one or more of reporting periodicity, delay tolerance, etc. The UE may choose the transmission time to be a random time within the transmission window, for example to desynchronize the UE's uplink transmission, e.g., from transmissions of other members of the group. The UE may aggregate a plurality of data samples before sending the uplink transmission.

BRIEF DESCRIPTION OF THE DRAWINGS

A more detailed understanding may be had from the following description, given by way of example in conjunction with the accompanying drawings wherein:

FIG. 4 illustrates an exemplary offset matrix for UL transmission parameter adjustments;

FIG. 5 illustrates exemplary changes in an 802.16p group paging message;

DETAILED DESCRIPTION

A detailed description of illustrative embodiments may now be described with reference to the figures. However, while the present invention may be described in connection with exemplary embodiments, it is not limited thereto and it is to be understood that other embodiments may be used or modifications and additions may be made to the described embodiments for performing the same function of the present invention without deviating therefrom. In addition, the figures may illustrate call flows, which are meant to be exemplary. It is to be understood that other embodiments may be used. The order of the flows may be varied where appropriate. Also, flows may be omitted if not needed and additional flows may be added. As used herein, the term user equipment (UE) may include MTC devices (e.g., an M2M subscriber station, an M2M end-user device, etc.), any mobile device capable of wireless communications with an access network, etc.

Figure 1A:
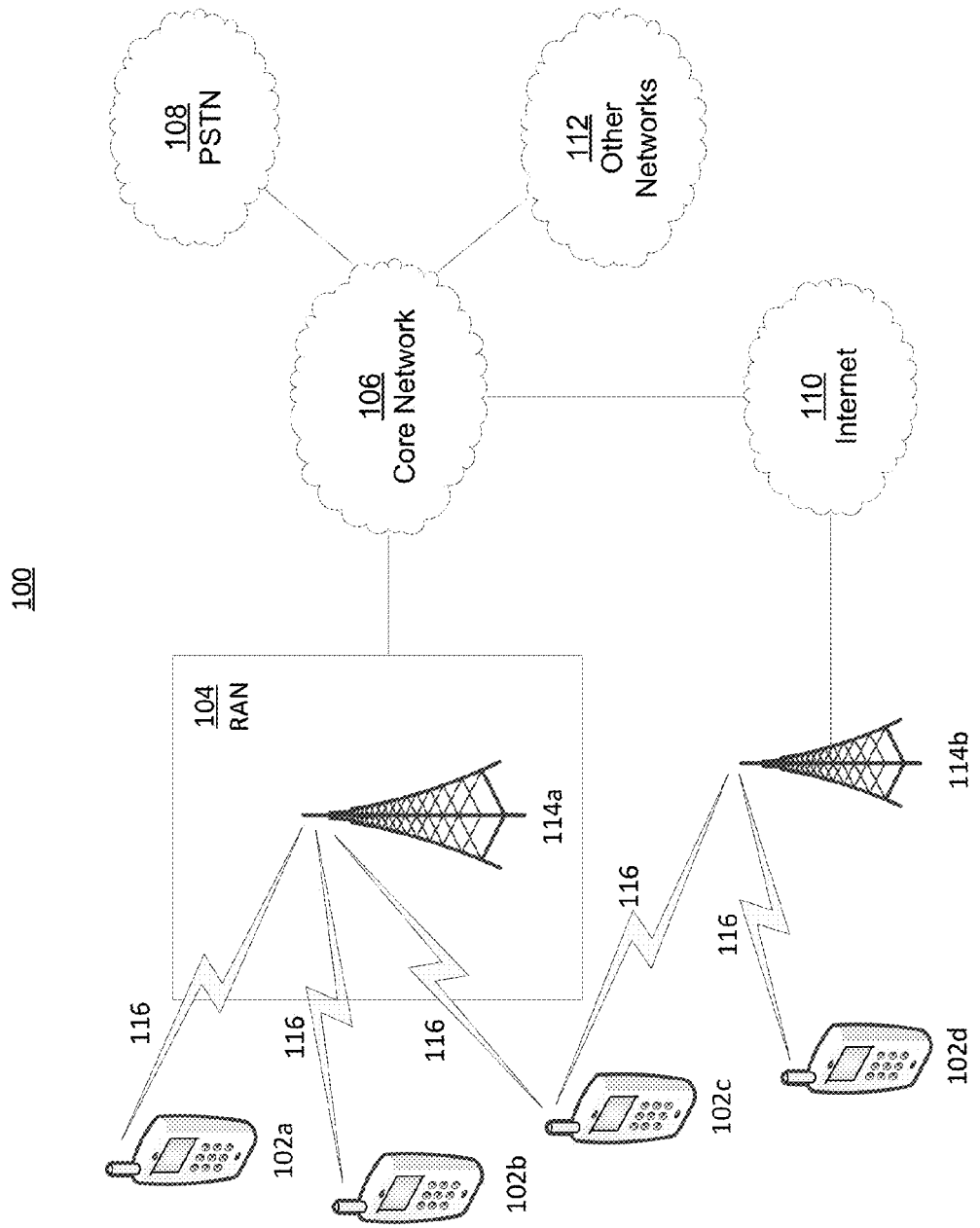
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
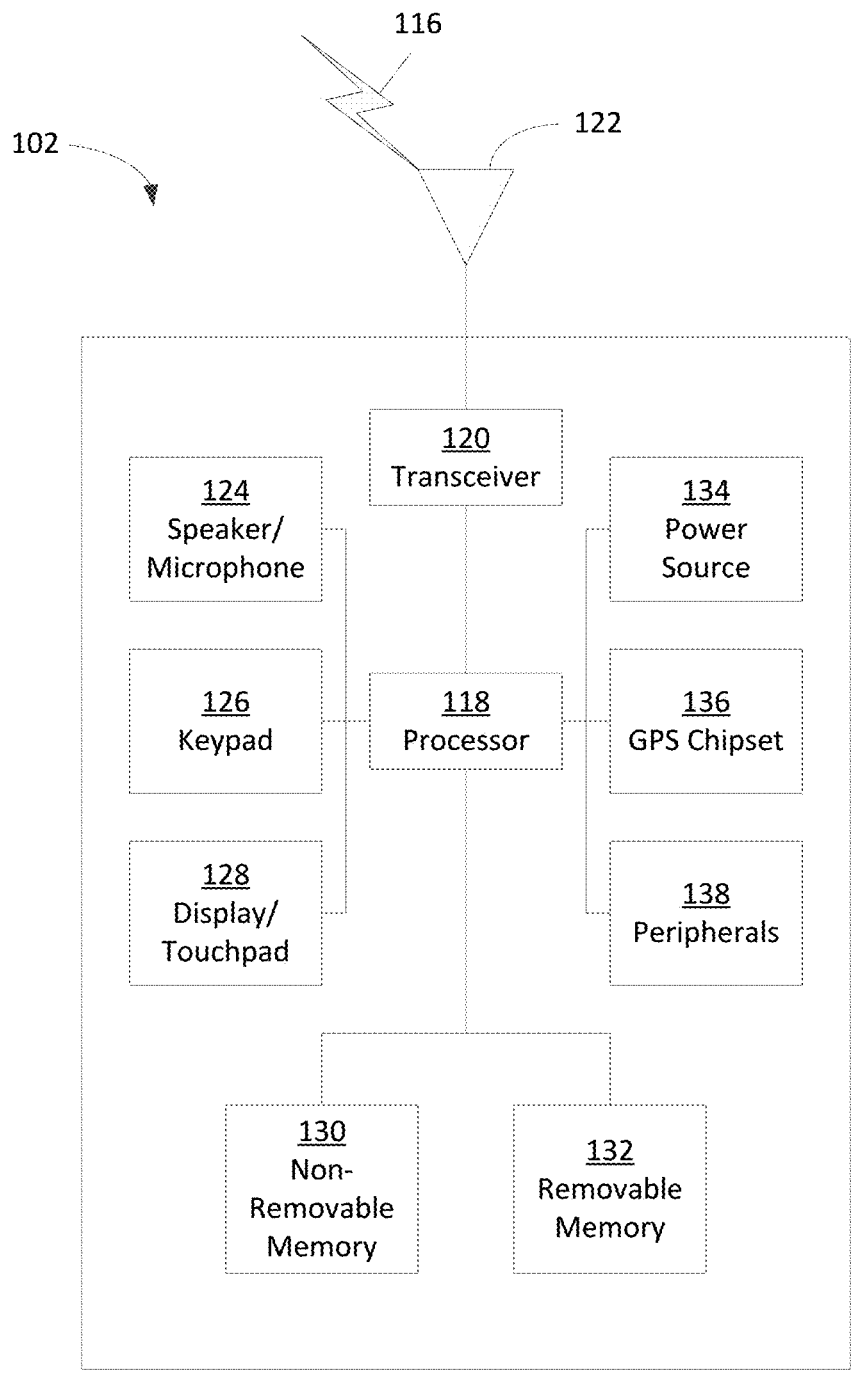
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
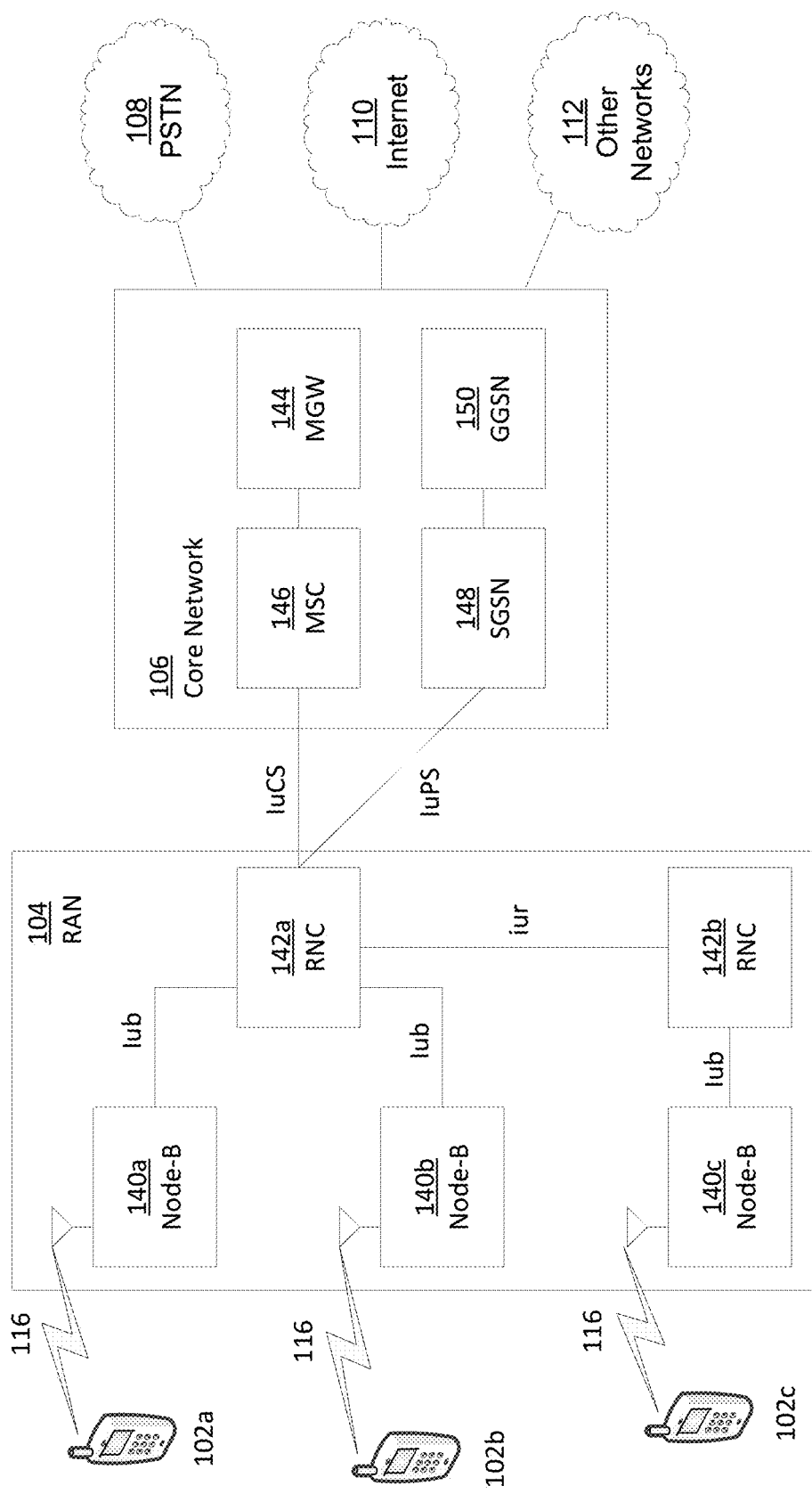
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
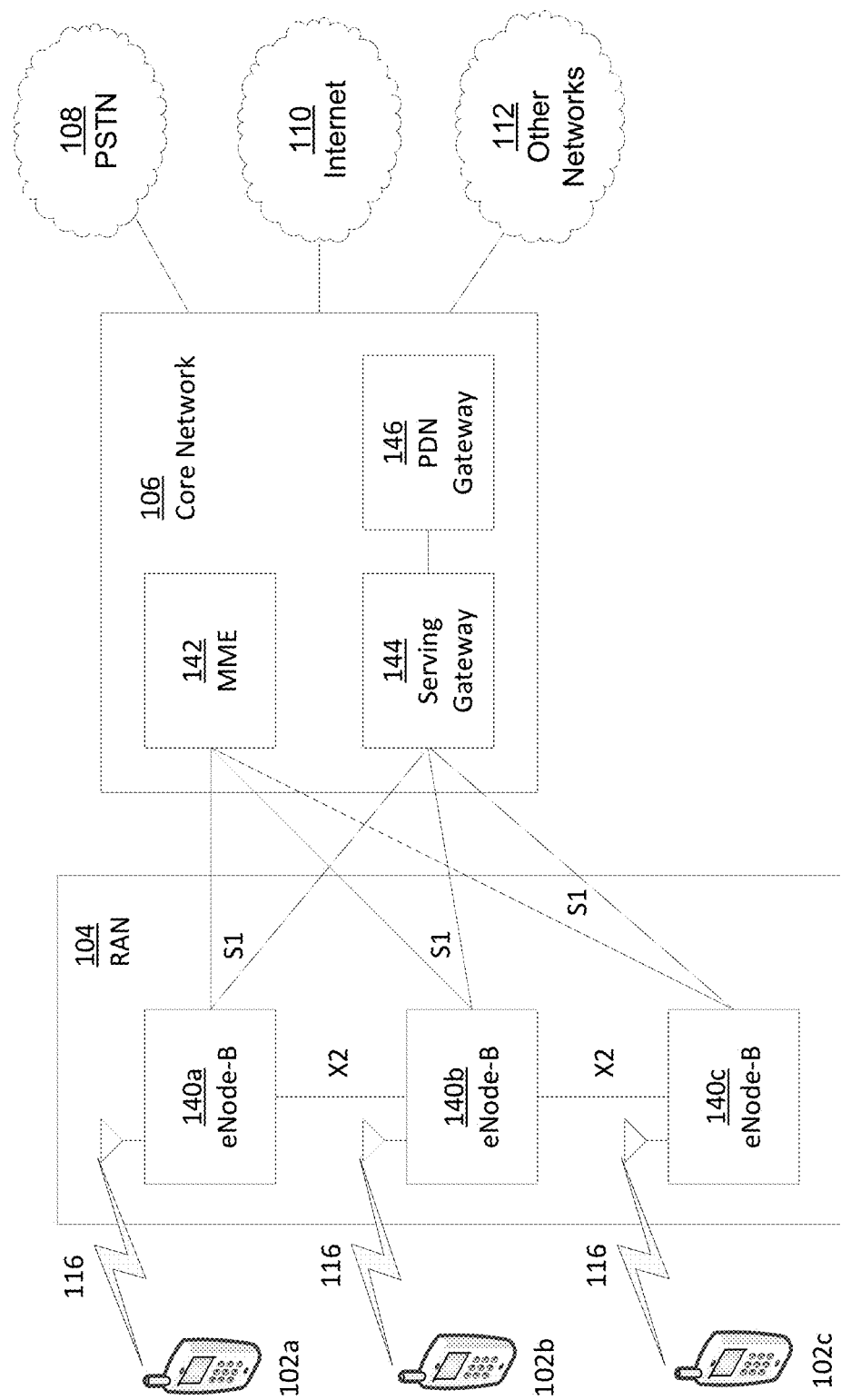
FIG. 1D is a system diagram of an another example radio access network and another example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1D, the eNode-Bs 140a, 140b, 140c may communicate with one another over an X2 interface.

The core network 106 shown in FIG. 1D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
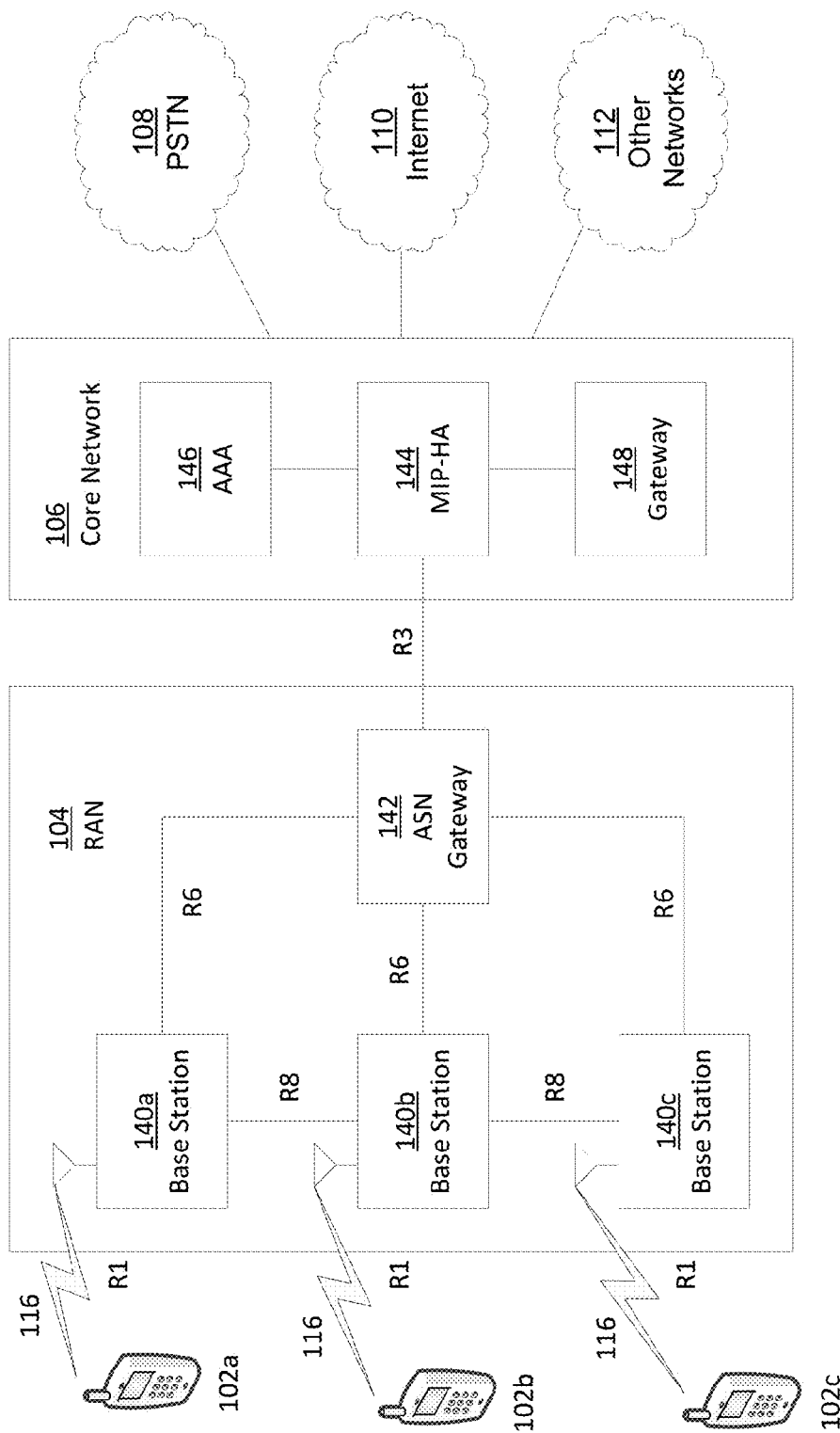
FIG. 1E is a system diagram of an another example radio access network and another example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 and the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Systems, methods, and instrumentalities are disclosed to desynchronize UE transmissions, e.g., in group-based operations. A user equipment (UE), e.g., a group UE that is a member of a group of UEs, may be in an inactive mode. An inactive mode may relate to an idle mode in systems such as HSPA, LTE, 802.11, WiMAX, and the like. The UE may determine a mechanism for the UE to use to send an uplink transmission to a network, for example when entering an active mode (e.g., a mode where uplink transmissions to the network may be sent) from an inactive mode. For example, the UE may use the active mode for periodic reporting of its monitoring activity to the network. The UE may send the uplink transmission to the network at a transmission time indicated by the mechanism. The transmission time may be desynchronized from other UEs, for example other UEs in a group comprising the UE (e.g., the group may be UEs associated with a particular base station). The desynchronized transmission time of the UE may be spaced apart from transmission times associated with the other UEs.

The mechanism may comprise the UE setting the transmission time to a time indicated in a multicast message received from a base station. For example, the base station may perform phase calculations based on one or more of reporting periodicity, delay tolerance, available system time, etc. The base station may perform the phase calculations for a plurality of UEs, e.g., the group of UEs. The base station may calculate phases (e.g., transmission opportunity times) to distribute uplink transmissions of UEs throughout available resources (e.g., transmission opportunity times, channels, etc.). The base station may use the phase calculations to provide the time to the UE. The base station may provide a mapping to the UE and/or members of the group, that maps the UE and/or members of the group to a time (e.g., transmission opportunity). The time may provide the UE and/or members of the group with contention free access to the network.

The mechanism may comprise the UE or a base station determining a transmission window. The transmission time may be within the transmission window. The transmission window may be determined based on one or more of reporting periodicity, delay tolerance, etc. The UE may choose the transmission time to be a random time within the transmission window, for example to desynchronize the UE's uplink transmission, e.g., from transmissions of other members of the group. The UE may aggregate a plurality of data samples before sending the uplink transmission.

An M2M device may, for example, refer to an M2M subscriber station in an access network, an end-user device (e.g., a smart meter, or a concentrator, or a Data Aggregate Point (DAP)), etc. A base station (BS) may denote an access point, which may be referred to as an attachment point, etc., in the access network that connects subscribers to the network (e.g., a NodeB/eNB in 3GPP, BS/ABS in 802.16/WiMAX, etc.).

There may be different traffic characteristics with M2M use cases. For example, for regular monitoring or reporting in M2M applications, data traffic may be characterized as periodic, small-size burst (e.g., <=100 bytes), high tolerance in latency for end-to-end delivery and/or acknowledgement (e.g., seconds, minutes, hours, days, etc.), large number of M2M devices (e.g., 5 k to 30 k smarter meters in a typical cell size of 0.5 km to 2 km in urban areas), low duty cycle with high idle time, etc.

In a network supporting M2M applications, a large number of M2M devices with periodic monitoring and/or reporting of data may result in bursty uplink (UL) traffic loads to the network. Such bursty UL traffic loads may temporarily overload the system causing unnecessary system congestions or system failures. For example, in a smart meter application, there may be five thousand M2M devices (e.g., smart meters or concentrators or data aggregate points (DAPs)), in a wireless access network. The periodicity of monitoring and/or reporting may be 10 minutes. If the five thousand M2M devices operate in a synchronized way, they may access the network simultaneously, generating a bursty UL traffic load to the network. On the other hand, if a system is designed to handle such worst-case UL bursty traffic load, it may result in an over-design for the system (e.g., poor system utilization and efficiency).

Desynchronized access may address bursty UL traffic load issues resulting from synchronized periodic monitoring and/or reporting data, e.g., from a large number of M2M devices. For example, network access by the M2M devices may be staggered.

The reporting operations of M2M devices (e.g., smart meters, concentrators, DAPs, etc.) may be desynchronized with normal periodic monitoring and/or reporting and delay-tolerant data through base station (BS) coordination, M2M device self-control, a combination of the two, etc. Desynchronize may mean to space the UL traffic data transmissions in the available access network system resources for the periodic reporting operations of the M2M applications. Such spacing may or may not be uniform.

BS coordination may be used to desynchronize UL traffic data transmissions, which may be referred to as BS-coordinated desynchronized access. The BS may inform M2M devices when or how to conduct UL access with regard to M2M data reporting operations. Such information may be generated by the BS during its attempt to desynchronize UL access of the M2M devices, e.g., within the delay-tolerance of the M2M applications.

Device self-control may be used to desynchronize UL traffic data transmissions, which may be referred to as device-controlled desynchronized access. An M2M device may attempt to desynchronize its UL data transmissions from other M2M devices by choosing a window for its next UL access. The selected window may be based on M2M device reporting periodicity, delay tolerance, etc. The M2M device may randomly choose a time within the selection window to request UL transmission.

A hybrid approach to desynchronize UL traffic data transmissions may combine BS coordination and device self-control, which may be referred to as hybrid BS and/or device coordinated desynchronized access. In this approach, the BS may group certain M2M devices together and assign them to windows or slots in which to conduct UL access for data reporting. The M2M devices may randomly choose a time within the assigned window and/or slot for UL transmission.

A data sampling procedure and data reporting procedure for normal periodic monitoring and/or reporting operations with delay-tolerant data may be decoupled. Within a delay tolerance, aggregate multiple data samples of the same device may be collected over time into a report, such that data reporting efficiency may be improved by reducing overhead (e.g., reducing the number of network re-entry times, which may increase the ratio of data payload to protocol data unit headers, etc.). Network reentry may refer to an M2M device transitioning from an inactive mode (e.g., idle mode) to an active mode (e.g., connected mode).

In BS-Coordinated desynchronized access, a BS may maintain the phases of M2M devices based on the reporting periodicity, delay-tolerance, and available system time for M2M device reporting operations. Herein "phase" may refer to a time or time interval for the M2M device reporting operation. The BS may arrange UL access for M2M devices in a distribution (e.g., a uniform distribution) such that the M2M reporting data traffic may be desynchronized, e.g., within the delay tolerance of an M2M application. For example, for an M2M application, devices may have idle and connected states. When in an idle state, for power saving purposes, the devices may be deregistered from the access network and may be powered down. The devices may periodically wake up from the idle state to report certain monitoring data, e.g., smart meters, e-health monitors, etc. The devices may re-enter the access network and transition into a connected state. When connected to the network, the devices may transmit the reporting data. Depending on the periodicity of the reported data and the data to-be-reported, the M2M devices may alternate between a long idle state and a short connected state.

In an example of BS-Coordinated desynchronized access, when an M2M device is in a connected state but before it enters or re-enters an idle mode, the BS may inform the M2M device of is its next wake-up time. The wake-up time may be chosen by the BS such that the network accesses from the serviced devices may be spaced in the time duration available for (e.g., allocated to) the reporting operations of multiple M2M devices.

For an M2M device with periodic monitoring and/or reporting operations, its phase, e.g., next reporting time, may be determined by multiple factors (e.g., reporting periodicity, delay tolerance, available system resources for M2M periodic-reporting operations, traffic load and distribution of other M2M devices, etc.).

Available system resources for M2M periodic-reporting operations may refer to system resources allocated for M2M devices to conduct periodic reporting, which may be determined by the BS based on available information (e.g., real-time traffic load, historical statistics of system loads over time, QoS parameters of provided services, etc.). For example, within delay tolerance, the BS may arrange the time durations for M2M device reporting operations when the system load is lower than a pre-defined threshold value, such that the system may support multiple applications, including M2M applications, while meeting QoS requirements of other supported applications.

In the following example, system time may be used to illustrate the phase calculation, although there may be other types of system resources (e.g., subchannels in frequency domain of wireless systems, etc.). T may denote the system available time for M2M periodic reporting operations at time t0. There may be NM2M devices, $D_0, D_1, \ldots$, and $D_{N-1}$, that may conduct periodic reporting operations during the time interval [t0, t0+T], with the considerations of the reporting periodicity and delay-tolerance of the M2M devices. In an example of BS-coordinated desynchronization access, the BS may calculate the phases of the N M2M devices to space access of the M2M devices in the available system time internal [t0, t0+T]. The following is an example of the phase calculations at the BS:

$$P(D_i)=t0+i*T/N, \text{ where } i=0, 1, 2, \ldots, N-1, \text{ where}$$

$P(D_i)$ may denote the phase of device $D_i$, for example the next access time (e.g., transmission opportunity time) of device $D_i$. The BS may inform the device $D_i$ of the phase $P(D_i)$, e.g., at a time during the previous connected state of $D_i$.

With BS-Coordinated desynchronized network access, the BS may calculate the next phase for each M2M device with periodic reporting operations, for example, when the M2M devices are in a connected state with the BS. Before an M2M device enters to the idle state, the BS may inform the M2M device of its next phase (e.g., transmission opportunity time), which the M2M device may use as its transmission time.

Phase information of an M2M device (e.g., next phase) may be encoded in network interface control and/or management messages (e.g., MAC messages in the air interface as defined in 802.16/WiMAX system). Phase information may be encoded in separate MAC messages, or it may be added as an information field in an existing MAC message (e.g., DREG-CMD message in 802.16-2009, AAI-DREG-RSP message in 802.16m, etc.).

When a WLAN system, e.g., 802.11/WiFi, is used as the access system in M2M communications, the next phase information of an M2M device may be encoded and communicated in a MAC management frame, added as an information element (IE), or information field in an existing MAC management frame, e.g., WNM-Sleep Mode Response frame, when the WNM-Sleep mode is used. If a periodic sleep operation is initiated, then the next phase information may be signaled by one or more of the following: the starting time of the next sleep interval; and the length of the sleep interval where a sleep interval may comprise an unavailable interval (e.g., not-listening window) and an available interval (e.g., listening window).

The next phase information of an M2M device may be presented as an offset value with the current frame time as a reference point, wherein the current frame may be the frame where the next phase information is transmitted to the M2M device. The offset value may be coded in the units of radio frames or superframes, in the units of time (e.g., microsecond, millisecond, etc), etc. The next phase information of an M2M device may be presented as a time value that may be a superframe number or a system time value that the device may interpret in terms of its own system clock, e.g., based on superframe number synchronization and/or system time synchronization between the BS and the device.

When the next phase information is provided by the BS to an M2M device, the M2M device may use the given phase for its next network access (e.g., the M2M device may use the phase information for its transmission time). Depending on different timing requirements of different systems, the M2M device may interpret a given phase as a time point or a time period. For example, if the phase given to the device is $P(D_i)$, then the device may interpret it as the time period $(P(D_i)-\Theta, P(D_i)+\Theta)$. The value, $\Theta$, may be pre-defined or it may be signaled by the BS along with the phase value $P(D_i)$.

When an M2M device re-enters the network, e.g., from an idle state in order to perform its periodic reporting operations as needed for the M2M application, random access may be used to initiate the communications with the BS (e.g., in the 802.16/WiMAX systems). For an M2M device with a fixed location or relatively fixed location (e.g., moving slowly within a cell), it may re-enter the access network associated with the cell (e.g., the BS associated with the cell). In this case, in addition to the next phase information, during a connected state of an M2M device the BS may provide the M2M device with additional information for its next network re-entry procedure, e.g., in order to speed up and/or optimize re-entry. For example, the BS may inform the M2M device of a random access opportunity, including random access slot and random access code, to use for its next network re-entry at the next phase. The BS may give the device a special ID for the next phase. System performance may be improved because the device may avoid collisions in the random access based network re-entry process due to the provided dedicated random access opportunity. System performance may be improved because the address space (e.g., the length of IDs), may be reduced due to the association between ID and phase. System performance may be improved because some network re-entry steps may be skipped (e.g., basic capability negotiation, security checking, etc.), due to the mapping between the ID+phase to the device.

The BS may signal an M2M device the information about its next network access, including phase, dedicated random access opportunity, special ID, etc., in a network interface control and/or management messages (e.g., MAC messages, such as DREG-CMD, AAI-DREG-RSP, in 802.16/WiMAX systems).

Polling based network re-entry may be used for M2M devices with pre-determined phases for their next network access, which may be in addition to a general-purpose random access based network entry and/or re-entry scheme. With polling-based network re-entry, the BS may inform an M2M device of its next phase for network access, a polling-based network re-entry indicator, a special ID to use for its next network re-entry procedure, etc. At a given phase, the BS may poll a given special ID to get a device reconnected (e.g., instead of using random access for the network re-entry). Because the next phase information may be provided to the device in advance, the time-controlled polling approach may not require a longer awake time. Polling-based network re-entry may reduce loading on random access channels of the system.

The BS may signal an M2M device with information about the polling-based network re-entry in network interface control and/or management messages (e.g., MAC messages, such as DREG-CMD, AAI-DREG-RSP, in 802.16/WiMAX systems.).

BS-coordinated desynchronized access mechanisms may involve the desynchronization of periodic network access, e.g., from devices staying in the same access BS. The M2M device may be at a fixed location or moving within the same BS's access network. BS-coordinated desynchronization mechanisms may involve the network level, and may be referred to as network-coordinated desynchronized access.

Network-coordinated desynchronized access may re-use the mechanisms in BS-coordinated desynchronized access.

Network-coordinated desynchronized access may include one or more of the following: 1) the phase calculations may be performed at a network element (e.g., network coordinator) that coordinates the desynchronized access from the devices in the network (e.g., an access service network (ASN) gateway, a connection service network (CSN) gateway, etc.); 2) the calculated next phase information may be provided by the network coordinator to the current serving BS of an M2M device, e.g., upon request by the BS to the network coordinator; 3) the next phase information of an M2M device may be provided by its current serving BS, wherein the next phase information may include the next phase with the current serving BS and the next phases with neighbor BSs; and 4) the M2M device, with the next phase information, may perform its next network access at a given phase depending on which BS it is going to access.

Device-controlled desynchronized access may allow M2M devices to have control of how they desynchronize their UL traffic data transmissions. With device-controlled desynchronized access, an M2M device may attempt to desynchronize its UL data transmissions from other M2M devices by choosing a window as its next UL access window based on its reporting periodicity, delay tolerance, etc. The M2M device may randomly choose a time in the selected window to perform network access for its UL transmissions. For example, an M2M device with periodic reporting operations, based on its reporting periodicity, delay-tolerance, etc., may have a next network access time interval of [t0, t0+T]. The M2M device may then randomly choose a time in this interval as its next network access time. If a large number of M2M devices with similar periodic reporting operations use this scheme to determine their next network access, the network traffic from the M2M device may be desynchronized.

If a WLAN system, e.g., 802.11/WiFi, is used as the access system in M2M communications, and if a power saving (PS) mode is used to support M2M devices with periodic reporting operations, then an M2M device may randomly choose a time in the interval [t0+T/2, t0+T+δ] as its next network access time for the first n sleep+reporting cycles after entering its normal reporting operation. The M2M device may then randomly choose its next access time in the interval [t0+T, t0+T+δ], where t0 is the time when the current access is completed, T is the periodicity of its periodic UL reporting operation, and δ is its delay-tolerance. The parameter n may be a system configuration parameter managed in MIBs (management information bases), or it may be a fixed value, e.g., depending on system implementation. The completion of the current access may be signaled by setting the power management bit within the frame control field in a MAC header of transmitted frames by the device.

An M2M device's group may be used as part of the randomization process, where a group ID may be used along with the device ID to generate a random value for the transmission window and/or transmission time. This technique may have the effect of isolating transmission groups from each other.

Hybrid BS and device coordinated desynchronized access may allow a combination of BS coordination and self-control of the M2M devices to desynchronize their UL traffic data transmissions. The BS may be responsible for grouping M2M devices to assigned windows in which they are to report, which may provide coarse grained de-synchronization between groups of M2M devices. M2M devices within an assigned window may in turn be responsible for providing desynchronized access between themselves (e.g., by randomly choosing the time in the selected window to perform network access for its UL transmissions). The M2M devices may provide fine-grained desynchronized access between individual devices within their respective assigned windows.

In 802.11, AP broadcasting opportunity access windows may be used in conjunction with a value unique to STAs, such as a MAC address, association identifier (AID), etc. In such a case, the AP may broadcast the windows in the form of a list of time offsets (e.g., which may correspond to the beginning and ending of a time window. STAs may calculate which window to use based on their unique identifier (e.g., AID, MAC address, IP address, etc.). A hash function may be performed to further randomize the window selection.

The AP may allocate windows based on a number of known nodes. The AP may advertise the group windows using a beacon or other method. Groups may be represented as an integer value representing the end of each group. For example, if you have four groups, the AP may advertise three values: {a, b, c} to represent those four groups. Assuming 1 octet for each group, a result may be expressed by a=63, b=127, and c=191. This may translate to the first group window occupying a time offset of 0t to 63t where t is a time value, the second group window may occupy a time offset of 64t to 127t, the third group window may occupy a time offset of 128t to 191t, and the fourth group window may occupy a time offset of 192t to 255t.

Each STA may use a hash function or other function to map its unique ID into an available window, and within that window, the STA may randomly select an access time. As the profile of STAs accessing the AP change over time, the AP may adjust the window count and/or sizes by broadcasting window definitions. New nodes entering the network may enter using the above technique or they may randomly select a transmission time.

Decoupling data sampling and/or reporting may improve network access efficiency for M2M applications with monitoring and/or reporting operations with delay-tolerant data. In data sampling and/or reporting decoupling, multiple data samples of the same device collected over time may be aggregated into a report (e.g., within the delay tolerance), such that the network control overhead for the data reporting can be reduced (e.g., reducing the number of incidences of network re-entry, which may increase the ratio of data payload to protocol data unit headers).

M2M devices may collect data samples periodically based on the corresponding M2M application, e.g., every n time units, where a time unit may be milliseconds, seconds, minutes, hours, radio frames, etc. The following is an exemplary method. The M2M devices may report data to the M2M application server over the access network based on the corresponding M2M application (e.g., every m time units, where m≥n). Monitoring and/or reporting M2M data may be delay-tolerant, therefore m may be chosen to be multiple times of n, m may be presented as m=k*n, where k is an integer and k>1. During data sampling, the M2M device may add a time stamp to each data sample, e.g., in order to preserve sampling time information. During data reporting, the M2M device may aggregate k data samples into one report. If a data report includes multiple data samples, the multiple data samples may be concatenated. The multiple data samples may be encoded in ways to improve coding efficiency. For example, the first data sample may be encoded with full information, and, a second data sample (e.g., and later ones) may be encoded with the changes from the previous one.

The decoupling of data sampling and reporting may facilitate efficient de-synchronization of network access for multiple M2M devices with periodic monitoring and reporting operation. The following may assist in efficiency gains: 1) the periodicity of the data sampling may be preserved, and, the requirement for the data reporting periodicity may be relaxed (e.g., the reporting time may not represent the sampling time); 2) the reporting periodicity may have a longer interval (e.g., comprising k data sampling intervals), which may result in less network access demands and a longer time interval for de-synchronization, etc.

A decoupling of data sampling and reporting may be used at the M2M application layer over the communication network connecting an M2M device and M2M server. It may also be used at a lower protocol layer over one or multiple hops along the path between M2M device and M2M server. For example, decoupling may be applied at a wireless access link, e.g., 802.16/WiMAX, between an M2M device and the BS in the access network.

M2M monitoring and reporting function modules at the M2M application layer may work as is (e.g., without participating in or knowing the decoupling process at the air interface layers). A sampling and reporting decoupling module may be added at the air interface at the two ends of the wireless access link (e.g., an M2M device and a BS). Within the delay tolerances for data reporting and the associated acknowledgement, if any, the decoupling module at the M2M device side may add timestamps to the received data samples from the M2M application layer. An M2M device may accumulate multiple data samples based on the delay tolerances, construct a MAC PDU with the multiple accumulated M2M data samples, and connect to the BS and deliver the data samples to the BS. If the decoupling module at the BS air interface receives the MAC PDU with aggregated multiple data samples, the BS may de-aggregate the MAC PDU back into the multiple data samples and then deliver the data samples to the next network element in the path to reach the M2M server.

In a wireless access network supporting multicarrier operations, each subscriber station (SS) may have a primary carrier, which may be reffered to as an anchor carrier, on which air link control information may be transmitted. For example, link control information may be network entry and/or re-entry, sleep mode and/or idle mode initialization and control, etc. Some subscribers may have secondary carriers that are used for data transportation, which may improve data throughput and system performance. The primary carrier of a subscriber station may need to be changed from one carrier to another carrier of the same base station (BS) during normal multicarrier operation, where the switch may be triggered by overall system performance considerations. For example, an overall performance consideration may be interference control, quality of service (QoS) provision, load balancing, etc.

An M2M subscriber group-based primary carrier change may include one or more of the following concepts. M2M subscriber groups may be formed based on grouping criteria that support subscriber group-based primary carrier change. Each M2M subscriber group may be assigned a group identifier, e.g., an M2M subscriber group ID (MSG ID), which may be unique in the domain of a BS or a larger domain, for example the domain of an access network or a core network in ETSI M2M high level system architecture. The same primary carrier may be assigned to each member station in an M2M subscriber group supporting group-based primary carrier change. The primary carrier of each member station may be changed (e.g., when a primary carrier change is triggered) in an M2M subscriber group, or a combination of groups as signaled, from the current primary carrier (e.g., serving primary carrier) to another carrier (e.g., target primary carrier) of the BS. A primary carrier change may be initiated for an M2M subscriber group by the BS, or each subscriber in the M2M subscriber group, or other entities in the M2M communication system, for example, the M2M application control center, resource management entities of access network and/or core network, etc. A group-based primary carrier change may be used for M2M subscriber groups without master subscriber(s) in the group. A group-based primary carrier change for M2M subscriber groups with master subscriber(s) in the group may be used.

At network entry of a M2M subscriber, the BS may check if the M2M subscriber (e.g., device) belongs to any groups based on predefined grouping criteria, where some parameters may need to be added in the initial network entry related messages, e.g., initial ranging and/or basic capability negotiation in 802.16/WiMAX systems. If the M2M subscriber belongs to a group or groups, then the BS may communicate with the subscriber to assign it to the group or groups.

If the M2M subscriber belongs to a group supporting group-based primary carrier change operation, the BS may check if the M2M is using the primary carrier of the group for its network entry procedure. If the M2M subscriber is using the primary carrier, further action may not be needed for the initial group primary carrier alignment. If the M2M is not using the primary carrier, then an initial group primary carrier alignment may be needed, e.g., changing the subscriber's primary carrier to the group-used primary carrier. The primary carrier change may be performed individually for the M2M subscriber or an initial primary carrier alignment.

Other primary carrier change mechanisms for subscriber groups without master subscriber(s) may include one or more of the following: a BS-initiated group primary carrier change; and, a subscriber-initiated group primary carrier change. In an access network, the BS may initiate a group-based primary carrier change, which may be triggered by system performance considerations, e.g., load balancing, interference control, QoS (Quality of Service) offerings, etc. For a BS-initiated group-based primary carrier change, the BS may transmit a primary carrier change control signal. For example, the primary carrier change control signal may be a primary carrier change command message to the M2M subscriber group at the serving primary carrier, where the M2M subscriber group may be identified by a pre-assigned M2M subscriber group identifier (MSGID) or by union or intersection of several such groups. An action time may be provided in the primary carrier change command message to indicate the time for the group to change the primary carrier from the current serving carrier to a specific target carrier, where the target carrier may be either specified in the primary carrier change command or pre-configured through system configurations. After the primary carrier change command is received and before the action time, the subscribers may get ready for the primary carrier change, e.g., the subscribers may activate the RF components for the target carrier, start monitoring the DL of the target carrier, etc.

At action time, the subscribers in the group may change their primary carrier from the serving carrier to the target carrier, which may include: synchronizing with the DL of the target carrier, monitoring and receiving the DL control signals, etc. After the action time, for example one or multiple radio frames after the action time, a confirmation procedure may be started to check the execution status of the group-based primary carrier change operations. Information about the confirmation procedure starting time may be provided by the BS in the group-based primary carrier change command message, in a separate message, or using a pre-defined and/or pre-configured value, e.g., an offset value from the action time.

The confirmation procedure may include BS polling, where the BS may transmit polls to each individual group member at the target carrier. A poll may be a unicast UL allocation or other unicast control signal to a subscriber. Polled subscribers may respond to received polls by transmitting a UL packet at the target carrier, e.g., a bandwidth request with non-zero or zero requested bandwidth. If the BS successfully receives the poll response from a polled subscriber at the target carrier, then the subscriber's primary carrier change may be confirmed. The BS may transmit a confirmation message to the subscriber with or without UL transmission parameter adjustments. If the BS does not receive the expected poll response from a polled subscriber at the target carrier, then the attempt of confirming primary carrier change may have failed.

The confirmation procedure may include a subscriber random access (RA). In the subscriber RA based confirmation procedure, group member subscribers may use the random access channels on the target carrier to transmit signals to the BS. If the BS receives the random access request and knows the sender's identification information from the received RA request, then the subscriber's primary carrier change may be confirmed. The BS may transmit a confirmation message to the subscriber with or without UL transmission parameter adjustments. If the BS receives the random access request but does not know the sender's identification information from the received RA request, the BS may allocate unicast UL allocation to the RA requester. If the subscriber receives a unicast UL allocation, it may respond by transmitting a UL packet at the target carrier, e.g., a bandwidth request with non-zero or zero requested bandwidth. If the BS successfully receives the UL packet transmitted by the subscriber at the given UL allocation at the target carrier, the subscriber's primary carrier change may be confirmed. The BS may transmit a confirmation message to the subscriber with or without UL transmission parameter adjustments. Within a pre-defined time interval, if the BS does not receive a UL transmission from a subscriber in the group at the target carrier, the subscriber's primary carrier change may not be confirmed. The pre-defined time interval may be either pre-configured through system configuration mechanisms or signaled in the BS's group primary carrier change command message. The value of the pre-defined time interval may be determined to trade off between avoidance of random access channel congestions due to a group of subscribers' RA attempts and reduction of the latency of the group primary carrier change confirmation process.

The confirmation procedure may include a hybrid BS polling and subscriber RA. In the hybrid BS polling and subscriber RA confirmation procedure, BS polling and subscriber RA mechanisms may be used to confirm that the BS may successfully reach and receive the group member subscribers at the target carrier, e.g., after the group primary carrier change. For example, it may have a max polling-wait time, and the subscribers may wait for a poll until the max wait time. After the max time, random access may be used. Another example is to use a known polling order. The subscribers staying in the to-be-polled queue with certain distance from the current poll may be allowed to use random access.

A retry mechanism may be used in the confirmation procedure for subscribers that may not be able to confirm at the target carrier. After completion of the confirmation procedure, the subscribers with successful confirmation on the target carrier may remain a group at the target carrier, while the subscribers with failed confirmations may be removed from the group. The BS may use unicast primary change procedures to make each subscriber change their primary carrier to the target carrier. A subscriber may join the target carrier group after successfully changing to a target carrier. Before completion of the confirmation procedure, the BS may not initiate other primary carrier changes to the same group. The BS may ignore primary carrier change requests from members of the group. In addition, the BS may also transmit a group-based primary carrier change completion indication to the group, which may deterministically inform the group of the completion of the group primary carrier change procedure.

Figure 2:
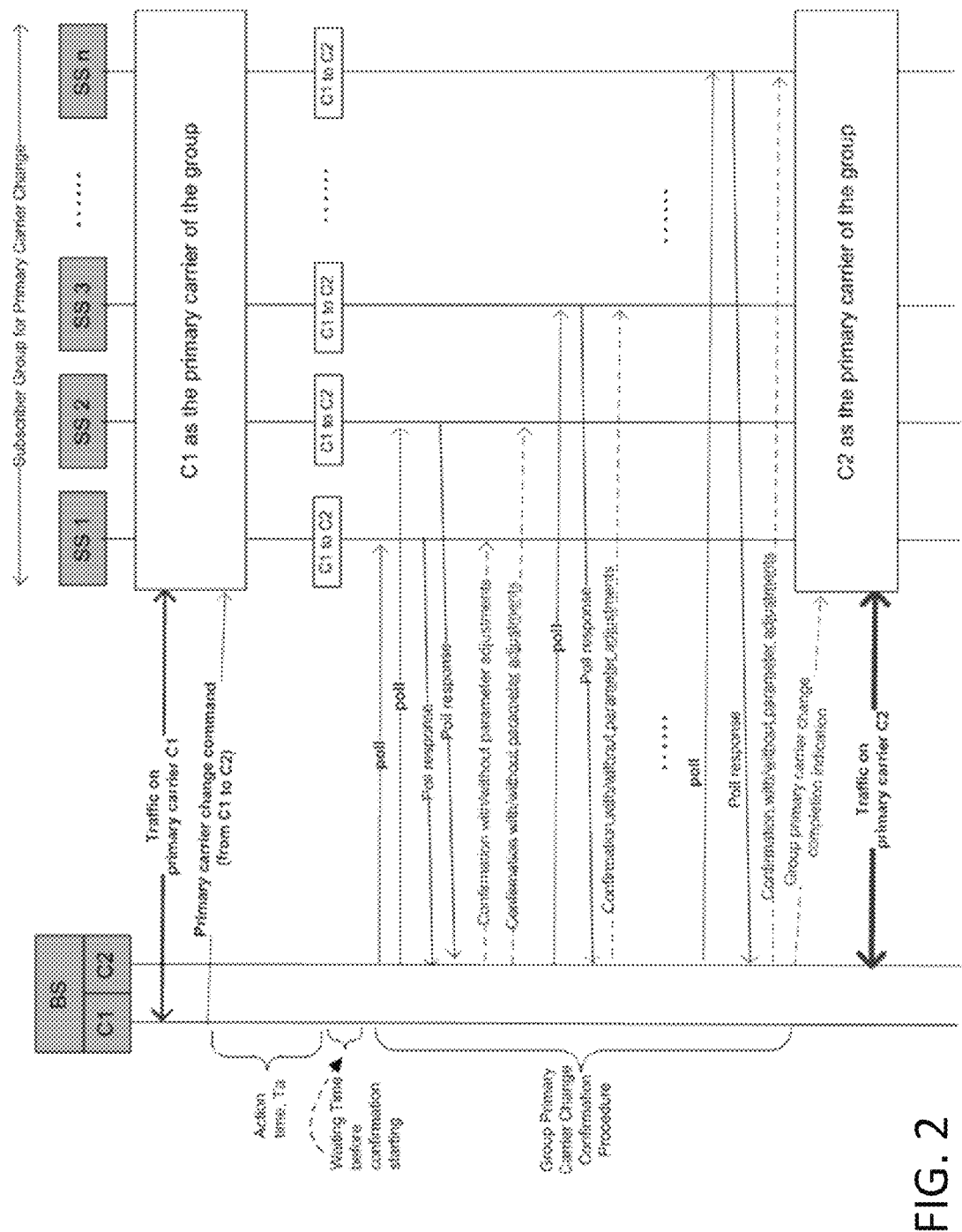
FIG. 2 illustrates an exemplary call-flow relating to a base station initiated group primary carrier change.

FIG. 2 illustrates an exemplary call-flow relating to a base station initiated group primary carrier change. One or more of the following control signals may be used for a base station initiated group primary carrier change. A group primary carrier change command may be a DL multicast control signal transmitted by the BS to the subscriber group, which may provide information needed by the subscriber group to conduct a group based primary carrier change, e.g., the group identification information, target carrier, action time, etc. A poll may be a DL control signal transmitted by the BS to subscriber(s) to request the subscriber(s) to transmit a response in the UL. A poll signal may be a UL allocation to the subscriber or subscribers. A poll response may be a UL signal transmitted by the subscriber to the BS to respond to a received poll. A poll response may be an UL signal to indicate the reception of the poll, e.g., an UL bandwidth request signal in 802.16, ranging confirmation message (RNG-CFM) in 802.16m, etc. Random access may be a set of signals between the BS and subscriber(s) for the subscriber to use random access changes to initiate communications with the BS. A confirmation signal may be a DL signal transmitted by the BS to a subscriber to confirm the UL reception on the target carrier, where UL transmission parameter adjustments, if needed, may be included in the confirmation signal. For example, a ranging response message (RNG-RSP) in 802.16e and a ranging acknowledgement message (RNG-ACK) in 802.16m may be used as the confirmation signals. A group primary carrier change completion may be a DL multicast control signal transmitted by the BS to the subscriber group, which may indicate the primary carrier change procedure has completed. This may imply that the BS is able to service new primary carrier change requests by group members.

The proposed group-based primary carrier change procedures may be supported by existing control signals in access network technologies, e.g., with or without additions and/or changes. For example, in 802.16/WiMAX, a change may be needed in the control signals to support the group-based primary carrier change procedures. For example, the change may be to introduce a multicast primary carrier change command and introduce a group primary carrier change completion indication message. This may be accomplished by changing the current primary carrier change command, AAI-CM-CMD, with action code Ob1, from unicast to unicast and multicast. A multicast primary carrier change command may be transmitting the AAI-CM-CMD with action code Ob1 in a DL allocation allocated to the subscriber group and/or transmitting the AAI-CM-CMD with action code Ob1 in a DL broadcast allocation and adding an identification field in the message to identify the intended subscriber group.

Following a primary carrier change command, the BS may broadcast the carrier group ID on the new primary carrier. An MS that has not received the carrier change command and stayed on the old primary carrier may not receive this broadcast message. An MS may transmit to the BS, on its primary carrier, a user ID of the MS and possibly one or more of the groups to which it belongs. If the BS detects that the subscriber's primary carrier stays with the previous carrier after a group-based primary carrier change operation of a group to which the subscriber belongs, the BS may transmit a primary carrier change command to the MS or assign the MS to new groups.

A subscriber in a subscriber group supporting group-based primary carrier change may initiate primary carrier change, e.g., triggered by system performance considerations, such as carrier channel quality comparisons, interference avoidances, etc. For a subscriber-initiated group-based primary carrier change, a subscriber in a subscriber group supporting group-based primary carrier change may transmit a primary carrier change request to the BS. The BS may receive and processes the primary change request. If the requester subscriber belongs to a subscriber group supporting group-based primary carrier change, the BS may evaluate whether or not the requested primary carrier change may be rejected or granted. If the requested primary carrier change is granted, the BS may evaluate whether or not to grant to the group or to limit the grant to the requester. The decision may be based on the BS's overall view on the group, the BS loadings and channel conditions, other system performance considerations, etc. If the BS decides to grant the primary carrier change request for the entire group, the BS may transmit a primary carrier change command addressed to the group identifier, and, the above procedure may be used to conduct the group-based primary carrier change.

If the BS decides to grant the primary carrier change request limited to the requester subscriber, e.g., not the entire group, then the BS may remove the subscriber from the primary carrier change group and transmit a unicast primary carrier change response signal to grant the requested primary carrier change. The subscriber may follow the individual subscriber primary carrier change procedure to complete the primary carrier change process. If the BS decides to reject the primary carrier change request, then the BS may transmit a primary carrier change response signal to reject the requested primary carrier change. During the time interval between BS's reception of a primary carrier change request from a subscriber of a group supporting group-based primary carrier change and the BS's transmission of a response to the requester, the BS may defer processing of received primary carrier change requests from subscribers in the same group. If the BS transmits a group-based primary carrier change command as the response to the received and/or processed primary carrier change request, the BS may ignore pending primary carrier change requests from other subscribers of the group. If the BS transmits a response to grant an individual subscriber primary carrier change or to reject the primary carrier change, the BS may process other pending primary carrier change requests.

Figure 3:
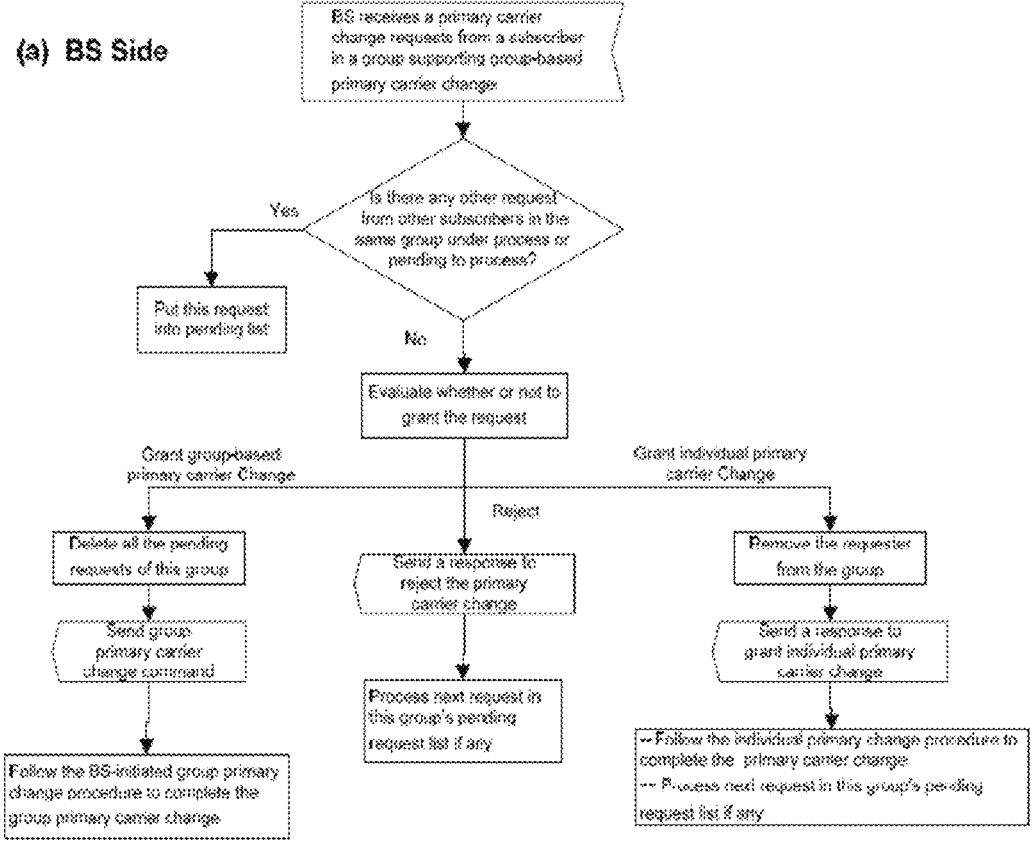
FIG. 3 illustrates an exemplary subscriber-initiated group primary carrier change.

FIG. 3 illustrates an exemplary subscriber-initiated group primary carrier change. Control signals that may be needed to support the above subscriber-initiated group primary carrier change procedure may be similar to those supporting the BS-initiated procedure. In addition, there may be a primary carrier change request signal transmitted by the subscriber to the BS. Such a primary carrier change request signal may convey information including the requester subscriber identification, suggested target carrier, the reason for requesting primary carrier change, etc.

A group-based primary carrier change for subscriber groups with master subscriber(s) for the access networks supporting multicarrier operations may be provided. The primary carrier change procedure for groups with master subscriber(s) may assume that a subscriber group has been formed to support group-based primary carrier change, each of the member subscribers are operating on the same primary carrier, and the master subscriber(s) has been chosen and is on-duty.

The following examples show how master subscriber(s) may communicate with the BS on behalf of the group, e.g., to reduce control signaling overhead in the access network. Confirmation of the primary carrier change on behalf of the group may be provided. In the confirmation procedure of the group-based primary carrier change, the master subscriber(s) may communicate with the group members to confirm the primary carrier change and re-confirm group membership, e.g., if the master subscriber(s) has a communication link with the member subscribers. The master subscriber(s) may communicate with the BS to provide the result information of the execution of the group-based primary carrier change command. Initiation of the group-based primary carrier change on behalf of the group may be provided. For a subscriber initiated primary carrier change, the master subscriber(s) may communicate with the group members to decide whether or not to change primary carrier. If the master subscriber decides to change the primary carrier, the master subscriber(s) may communicate with the BS to initiate primary carrier change for the group.

Control signals may be needed to support the above group-based primary carrier change procedures for the groups with master subscriber(s). Control signals may include one or more of the following: a control signal between the BS and the master subscriber(s) over the access link in the access network and a control signal between the master subscriber(s) and the member subscribers over a link connecting them, e.g., not through the BS in the access network.

To support the master subscriber(s) conducting a primary carrier change confirmation procedure on behalf of the group, as a response to a poll from the BS or upon receiving an UL allocation, the master subscriber(s) may transmit a control signal, e.g., a group primary carrier change indication message (Group-PCC-IND) to the BS on the target carrier to report the results of primary carrier change actions on behalf of the group. Information fields included in such a Group-PCC-IND message may be group identification, group primary carrier change results, etc. The group primary carrier change results may indicate which member subscriber(s) have successfully changed their primary carrier as instructed. The results may be coded with information describing the confirmed member subscribers, with information describing the not-confirmed subscribers, etc.

To support a master subscriber(s) initiating a primary carrier change on behalf of the group, the group identification and an indication of a request for a group primary carrier change may be included in the control signal transmitted by the master subscriber to the BS to initiate a group based primary carrier change. In responding to a group primary carrier change request from a master subscriber of a group, the BS may grant or reject the request on a group basis, e.g., the BS may grant or reject the request for the group, including the master subscriber.

For access networks supporting a large number of M2M subscribers, it may be beneficial to efficiently support channel quality measurements, feedbacks, and maintenances. For example, the control signaling overhead for conducting those air link quality and/or status related operations for a large number of subscribers may take up a significant portion of air link resources. Mechanisms may include groups without master subscriber(s) and groups with master subscriber(s).

For groups without master subscriber(s), subscriber groups may be formed for supporting group-based channel quality and/or status related operations. For example, a group may comprise member subscribers that have similar channel quality characteristics, including instant measurements at given time points, change pattern, etc. Examples of such groups may include subscribers that are co-located or located close to each other; subscribers that have fixed relative locations and the conditions between the BS and the subscriber locations are similar to each other; etc.

UL signals in the channel quality and/or status related operations, (e.g., channel quality feedback transmitted from subscribers to the BS and the periodic link status UL signals, such as, periodic ranging requests, coverage loss detection, keep-alive signals, etc.) may have longer periodicities for each subscriber and share the feedback information among group members. The UL signals may schedule the feedback transmissions from the group members in a desynchronized way, for example spread out over time. For DL signals in channel quality and/or status related operations, (e.g., subscriber UL transmission (Tx) parameter adjustments, such as, time-adjustment, power adjustments, frequency adjustments, etc.) the BS may transmit multicast signals to the group or combination of groups.

With the above described group-based link quality and/or status control related operations, the member subscribers in the group may be allowed to conduct individual link quality control operations, and, the BS and the subscriber may conduct actions to dynamically maintain the membership of the subscriber in the group, e.g., depending on how often and/or how many times such individual operation happens and how different the channel characteristics are from other group members. Group membership maintenance actions may include removing from, suspending from, or adding to a group.

Where subscriber groups are formed with subscribers having similar channel characteristics, the group-based channel quality and/or status related operations may allow longer periodicities for the UL periodic reporting and/or action for each member subscriber of the group. As an example, assume a group has n member subscribers and each subscriber on its own may need feedback channel allocation, for example, every r frames. Due to the share the channel feedbacks among the group members, the group-based feedback may require each member subscriber to feedback, for example, every n*r frames, and, the BS may schedule the feedbacks from the group members in a distributed way in the interval of n*r frames. However, the periodic UL reporting and/or actions for channel quality and/or status related operations may be designed with a max periodicity value, for example, the max interval for the channel quality indicator channel (CQICH) feedbacks may be 128 radio frames in 802.16e, and 1024 radio frames in 802.16m, where a radio frame is 5 ms. Without changing those max intervals specified in existing radio access network technologies, the interval of channel feedback of each group member may be min(n*r, M), where M is the maximum interval specified in the access network technology under consideration, and min( ) may refer to the minimum value.

Changing the maximum intervals for periodic UL reporting and/or actions for channel quality and/or status related operations may be needed in order to take advantage of the group-based channel quality and/or status operations. For example, changing the 802.16e CQICH feedback allocation max period from 128 radio frames to a larger number, e.g., 1024 frames, 2048 frames, etc., may be needed. In order to support the group-based DL signals transmitted by the BS in a multicast way for the channel quality and/or status related operations, multicast signals to the group may be needed, which may be a set of messages or the current corresponding messages with some changes. For example, in 802.16e, a unicast message, which may be referred to as a ranging response (RNG-RSP), may be used for the BS to provide UL transmission parameter adjustments, such as time, frequency, and power adjustments, to a subscriber. A minor change may be needed in 802.16e RNG-RSP message, e.g., allow the CID (connection ID) field in the MAC header of the RNG-RSP message to be a DL multicast CID—then the RNG-RSP message may be transmitted to the group identified by the DL multicast CID.

As another example, in 802.16m, the BS may transmit a message, which may be referred to as a ranging acknowledgement (RNG-ACK) in a unicast DL allocation to a subscriber to provide the UL transmission parameter adjustments. One or more of the following exemplary approaches may be used to multicast an 802.16m RNG-ACK message to a subscriber group for UL transmission parameter adjustments.

Let the RNG-ACK message, with UL transmission parameter adjustments, be transmitted in a multicast DL allocation for the subscriber group. This may require changes in the 802.16m specification, for example, changing the RNG-ACK message design to allow the case of UL transmission parameter adjustments transmitted in a multicast DL allocation and changing the DL resource allocation A-MAP IEs to allow DL multicast allocation, e.g., mask group ID with the CRC of an A-MAP IE.

Let the RNG-ACK message with UL transmission parameter adjustments be transmitted in a broadcast DL allocation and include the group identification information in the RNG-ACK message for the UL transmission parameter adjustments. Changing the RNG-ACK message in 802.16m may be needed to allow the UL transmission parameter adjustments to be transmitted in a broadcast DL allocation and associate to a group identification or a combination of groups.

Subscriber groups for supporting group-based channel quality and/or status related operations for groups with master subscriber(s) may be formed. For example, each group may comprise member subscribers that have a stable and known relationship with the group master subscriber(s) in terms of channel quality characteristics so that each member subscriber's channel quality measures and required adjustments may be derived from given parameter values of the master subscriber(s). Groups with define related conditions, such as those where the conditions between the BS and the subscriber locations are known or those that have fixed position relative to the master, may also be formed. The BS and the member subscribers in the group may maintain offset matrixes of the channel quality related parameter values relative to the master subscriber(s).

For UL signals in the channel quality related operations (e.g., channel quality feedback transmitted from the subscribers to the BS, and the periodic link status UL signals, such as, periodic ranging requests, coverage loss detection, keep-alive signals, etc.), the master subscriber(s) may conduct operations on behalf of the group. When the BS receives the UL signals from the master subscriber(s), it may use the offset matrixes to derive the corresponding parameter values for the other member subscribers.

For DL signals in the channel quality related operations (e.g., subscriber UL Tx parameter adjustments, such as, time-adjustment, power adjustments, frequency adjustments, etc.), the BS may transmit multicast signals to the group with the parameter values of the master subscriber(s). When the member subscriber(s) receive such multicast DL signals with parameter values for the group master subscriber(s), they may use the offset matrixes to derive their own parameter values.

With the above proposed group-based link quality control related operations, the member subscribers in the group may be allowed to conduct individual link quality control operations, and, the BS and the subscriber may conduct actions to dynamically maintain the membership of the subscriber in the group, e.g., depending on how often and/or how many times such individual operation happens and how different and/or difficult it is to maintain the subscriber's membership in the group. The group membership maintenance actions may include removing from, suspending from, or adding to a group.

In order to support the DL signals transmitted by the BS in a multicast way for the group-based channel quality and/or status related operations for the groups with master subscriber(s), DL control signal supports similar to cases for the groups without master subscriber(s) may be needed. In the case where there are multiple master subscribers in a group, providing the master subscriber information for each set of link quality and/or status parameter values in the DL multicast signals to the group may be needed, e.g., so that the member subscribers have deterministic knowledge about which offset matrix may be used. For example, in 802.16e based systems, to support the multicast RNG-RSP message for the group with master subscriber(s), a master subscriber ID field may be added for the set of UL transmission parameter adjustment values. Similarly, in 802.16m based systems, if the RNG-ACK message is transmitted to a subscriber group for UL transmission parameter adjustments for a group with master subscriber(s), the master subscriber identification may be provided for the set of UL parameter adjustment values.

For periodic UL control signals and/or actions for channel quality and/or status related operations, the proposed group-based mechanism for the groups with master subscriber(s) may allow a long periodicity or non-periodic signals and/or actions for the non-master subscribers in the group. For example, as the master subscriber(s) may conduct the periodic actions on behalf of the member subscriber(s) and the channel quality and/or status measures of each member subscriber may be derived by the offset matrixes and master subscriber(s) measures. The non-master subscribers may be set to the longest allowed interval for their channel quality and/or status related periodic UL signals and/or actions, or they may be excused from performing such periodic UL signals and/or actions. The master subscriber(s) may conduct the periodic signals and/or actions with the periodicity as normally required.

The offset matrixes may play a role in the proposed group-based channel quality and/or status related operations for the groups with master subscriber(s). Depending on the channel quality and/or status parameters, the offset matrixes may be generated and maintained by the BS and the subscribers, which may include coordination efforts among them. For example, for the UL transmission parameter adjustments, such as, time adjustment, frequency adjustment, and power adjustment, the BS may measure the received UL signals from the subscriber and the master subscriber(s), and calculate the offsets against each master subscriber, e.g., for multiple masters. The BS may transmit the offset matrix to the subscriber. FIG. 4 illustrates an exemplary offset matrix for UL transmission parameter adjustments.

For each member subscriber of a group supporting group-based UL transmission parameter adjustment operation, at initialization of a subscriber's group membership the BS may generate an offset matrix table specifically for the subscriber, and may transmit this table to the subscriber. With certain pre-defined triggers, for example, changes of the offsets exceeding a threshold, the BS may update the offset matrix table of a member subscriber and transmit the updates to the subscriber. Under the consideration that the group was formed with subscribers with relatively fixed channel quality differences from the group master subscriber (s), the offset matrix table update operations may be infrequently needed.

Different channel quality and/or status parameters may have different procedures for offset matrix usage, generation, maintenance, etc. For example, unlike the UL transmission parameter adjustments where the offset matrix tables may be transmitted to the subscribers and used by the subscribers, radio link CQICH feedback may not need involvement from a subscriber. The BS may generate, use, and maintain the offset matrixes based on received CQICH feedbacks from the member subscribers and the master subscriber(s).

Following is an example of how CQICH feedback matrixes are generated, used, and/or maintained at a BS. A subscriber may join a group that supports group-based CQICH feedback operation. The BS may generate an offset matrix for the subscriber based on the received CQICH feedback parameter values from the subscriber and the master subscriber(s). The BS may monitor the received CQICH feedback parameter values from the subscriber and the master subscriber(s) for a pre-defined period to see if the offset matrix is relatively stable. If the offset matrix is relatively stable, then the BS may change the subscriber's CQICH feedback allocation to a longer periodicity, and then during the interval between two consecutive CQICH feedbacks from the subscriber, the BS may use the received CQICH feedback from the master subscriber(s) and the offset matrix to derive the CQICH feedback parameter values for the subscriber.

When the BS receives CQICH feedback from the subscriber, the BS may use it to check the stability of the offset matrix and perform updates. If the offset matrix is stable, then the BS may increase the periodicity of the subscriber's CQICH feedback until reaching its max value. If the offset matrix has feedback changes that exceed some pre-defined thresholds, the BS may decrease the periodicity of the subscriber's CQICH feedback. Pre-defined thresholds may be set to remove the subscriber from the group.

The above group-based CQICH feedback operation may reduce the CQICH feedback overhead for groups with known and stable relative channel conditions among their member subscribers. For example, for a group with n member subscribers and 1 master subscriber, if the group-based CQICH feedback may allow the BS to use k times longer feedback interval (k>1), then the resulted CQICH feedback overhead reduction ratio is (n*k−k−n+1)/(n*k). For a group with n=20 subscribers, if k=3 is used, then the CQICH feedback overhead reduction ratio may be calculated as (20*3−3−20+1)/(20*3)=63.3%.

An M2M subscriber group-based handoff (HO) mechanism for groups without master subscriber(s) may be similar to the group-based primary carrier change mechanism described above. One difference may comprise a handoff between two BSs vs. changing a primary carrier within the same BS supporting multicarrier operations.

In a HO mechanism for groups without master subscriber(s), M2M subscriber groups may be formed based on the selected grouping criteria for group-based HO, including locating on the same moving object or objects, having fixed relative locations, etc. Each M2M subscriber group may assign a group identifier, which may be referred to as an M2M subscriber group ID (MSG ID), that may be unique in the domain of a BS or a larger domain, e.g., the domain of an access network or a core network in an ETSI M2M high level system architecture. When a group based HO decision is made, the BS may transmit a group HO command to the group to handoff each of the member stations in an M2M subscriber group from the current BS (e.g., serving BS) to another BS (e.g., target BS).

An action time may be provided in the group HO command message to indicate the time for the group to conduct HO from the current serving BS to a target BS. The subscribers may take steps to get ready for the HO after receiving a group HO command and before the action time. For example, steps to get ready for HO may be to start monitoring the DL of the target BS. At the action time, the subscribers in the group handoff from the serving BS to the target BS may synchronize with the DL of the target BS, monitor and receive the DL control signals, perform network re-entry at the target BS, etc.

A bursty network entry and/or reentry handling mechanism may be used, e.g., to deal with potential performance issues caused by bursty network entry requests from a group of subscribers triggered by the group HO command, where the serving BS may communicate with the target BS to provide necessary context information of the group and its member subscribers. The serving BS may provide the group in the group HO command with information to help de-synchronization of the network reentry requests at the target BS, e.g., network reentry random access channels for the group, which may or may not be dedicated to the group, a special backoff time, use of polling-based network reentry, etc.

After a pre-defined network reentry completion time, the subscribers with successful network reentry at the target BS may remain in the group at the target BS, while the subscribers without network reentry at the target BS may be removed from the group. Before the network reentry completion time, both the serving BS and the target BS may not initiate other group HO to the same group. The serving BS and the target BS may ignore HO requests from members of the group.

The group based HO procedure may be initiated by the BS, a member subscriber of the group, other entities in the M2M communication system, etc. For subscriber-initiated group HO, after receiving a HO request from a member subscriber of a group supporting group-based HO, the BS may evaluate the HO request for the entire group and may decide to grant the HO request to the group, grant the HO request to the requesting subscriber, or reject the HO request. If the serving BS and the target BS for a group-based HO operation are not in the same domain of subscriber group identification (MSG ID) assignment, the mapping between the MSG IDs in the serving BS and in the target BS may need to be signaled in the group-based HO command message.

DL multicast control signals may be needed to support the above group-based HO operations. For example, in 802.16e systems, the DL multicast HO control signals may be introduced by allowing DL multicast CIDs (connection IDs) or a DL broadcast CID used in MAC headers of the MAC PDUs carrying the DL HO messages, e.g., MOB_BSHO-REQ, MOB_BSHO-RSP, etc. When a broadcast CID is used, the group identification information may be provided, e.g., including a group ID field in the messages.

In 802.16m systems, the DL multicast HO control signals may be introduced by allowing the DL HO messages, e.g., AAI-HO-CMD, to be transmitted in a multicast DL allocation and/or broadcast DL allocation. If transmitted in broadcast DL allocations, the group identification information may be provided, e.g., including a group ID field in the messages.

In addition to multicast DL control signals, other signaling supports for the proposed group-based HO operations may be included to provide information or instructions to help the group of subscribers to reenter the network at the target BS. For example, if a special network reentry random access channel may be used for the group at the target BS, then the serving BS may provide the group in the HO control signals with information about this special network reentry random access channel allocation and usage. If some special backoff time is used and/or a polling-based network reentry procedure is used, the corresponding indications and descriptions may be provided to the group through the HO control signals.

The M2M subscriber group-based idle mode operations may include group-based idle mode initialization, group-based location update, group paging, etc. For the group paging case where the paged subscribers are required to re-enter the network upon receiving the paging, the bursty network entry and/or reentry handling mechanisms may be used, e.g., which may help with potential performance issues caused by a bursty network entry requests from the paged subscribers in the group paging. For example, control signals may be included in the group paging message to tell if polling or dedicated ranging channel and/or opportunity is used for the paged subscribers to conduct network re-entry. For the group-based location update, when the first member subscriber performs a location update, the BS may transmit out a DL multicast message to inform each of the other members of the group regarding the conducted location update. For idle mode initialization, DL multicast control signals may be used to initiate group-based idle mode operation, e.g., with the same paging cycle and location update cycle for each of the member subscribers of the group.

If a WLAN system, e.g., 802.11/WiFi, is used as the access system in M2M communications, a traffic indication message (TIM) information element transmitted in beacon frames or other DL management frames may be used as the DL paging signal to indicate the existence of buffered BUs (bufferable units). To support an efficient TIM encoding for the group-based power saving operations, the stations in a paging group may be assigned with association IDs (AIDs), e.g., in clustered values.

To support group-based location update operation and group-based idle mode initialization, the introduction of DL multicast control signals may be needed, e.g., similar to group-based primary carrier change and group-based HO operations. For example, in 802.16e systems, using multicast CIDs or a broadcast CID in the MAC PDUs carrying the DL control signals for location update and idle mode initialization may be allowed. In 802.16m systems, transmitting the DL control signals in the DL multicast allocations or broadcast allocations may be allowed. If the broadcast CID or broadcast DL allocations are used, the group identification may be provided.

In 802.16p, a group paging mechanism may be provided with or without network reentry (e.g., receiving multicast traffic). However, for the case of group paging with network reentry, there may be potential performance issues caused by the bursty network reentry demands of the group paging.

The following provides exemplary control signals, using 802.16p as example. FIG. 5 illustrates exemplary changes in the 802.16p group paging message. If multiple schemes (e.g., procedures) are supported, then an indicator field may be used to indicate the scheme used for a group paging instance. A general format of the "network reentry assistances" field may be

```
Network reentry assistances {
Bursty-handling Scheme indicator;
If scheme-1, then scheme-1 specific information field(s) if any;
If scheme-2, then scheme-2 specific information field(s) if any;
. . .
If scheme-n, then scheme-n specific information field(s) if any;
}.
```

If a polling-based network reentry scheme is used for the group of subscribers paged by a group paging message, an indicator field without any further specific information fields in the "network reentry assistances" field in the group paging message may be used. The indicator may tell the paged subscribers to wait for the BS's poll to reenter the network instead of using the network reentry random access channels. In addition to an indicator for the polling-based network reentry procedure, additional information may be provided in the "network reentry assistances" field, e.g., a max wait time for polls that tell the paged subscribers to wait for polls until the given max time. If still not being polled within the max time, the subscribers may use the random access channel to reenter the network. A poll to a paged subscriber may be a UL allocation to the subscriber, where the subscriber may be identified by an identifier assigned to it when entering the idle mode, its 48-bit MAC address, other form of identifiers, e.g., some hash code derived from its MAC address, etc.

If a WLAN system, e.g., 802.11/WiFi, is used as the access system in M2M communications, the polling-based network reentry with network assistance may be a combination of an indicator in the TIM element and PSMP (power saving multi-poll) sequences. The indicator in the TIM element may indicate to the paged stations not to use a contention-based access channel to send its DL traffic delivery request, e.g., PS-Poll, instead, wait for the UTT (UL transmission time) assignment, e.g., given in a PSMP sequence.

If a dedicated random access channel region is used for the paged subscribers to reenter the network, then the "network reentry assistances" field in the group paging message may include information about the dedicated random access channel region allocation. The paged subscribers may use the dedicated random access channel region to reenter the network, e.g., instead of using the regular network reentry random access channel so that the bursty network reentry demands as a result of group paging may not congest the regular network reentry channels. Additional random access channels may be allocated when using group paging, where the difference between dedicated random access channels and additional channels is the usage of the random access channels allocated due to the use of group paging.

If the dedicated random access opportunities are used for the paged subscribers to reenter the network, the proposed "network reentry assistances" field in the group paging message may provide the paged subscribers with information about the assigned dedicated random access opportunities. If some special parameters are used in the random access procedure for the paged subscribers to reenter the network, e.g., a special backoff window size, then such special parameter information may be provided in the proposed "network reentry assistances" field in the group paging message.

If a WLAN system, e.g., 802.11/WiFi, is used as the access system in M2M communications, and if there are special random access parameters, e.g., a special channel contention window size, for the paged stations, they may be signaled in the paging message, e.g., the TIM element, and, they may be system configuration parameters managed in MIBs (management information bases), they may be of fixed values depending on the system implementation, etc.

Some additions to grouping criteria and group configuration and/or maintenance may be usage-specific grouping and signaling, usage-specific master subscriber(s) selection and signaling, and group membership maintenance. Usage-specific grouping and signaling may include forming the subscriber groups based on the different group usages, e.g., group-based primary carrier change, group-based HO, group-based channel quality and/or status related operations, group-based paging, group-based location update, etc. Usage-specific grouping and signaling may include group usage type information in group-based operation control signals, e.g., when needed between the BS and the group and/or subscribers.

Usage-specific master subscriber(s) selection and signaling may be provided. For the groups with master subscriber (s), master subscriber(s) may be selected based on the group's usage type, e.g., for a group supporting link quality and/or status related operations, the master subscriber(s) may be selected based on the air link SNR measurements, for example the max, mean, or min SNR among the group. Usage-specific master subscriber(s) selection and signaling may communicate information about the master subscriber (s) between the BS and the group subscribers, e.g., when needed in group-based operation control signals.

Group membership maintenance may include group membership reconfirmation after group-based primary carrier change operations. Group-based HO operations and maintenance operations may be provided, including adding, removing, and updating group members, which may be triggered by various events, e.g., a pre-scheduled maintenance event, air link quality and/or condition changes, physical location changes, etc.

Group configuration and maintenance operations, e.g., configuring, adding, removing, and changing a subscriber's membership in a group, may be initiated by the BS or the subscriber. The general control flow may include grouping config and/or maintenance requests transmitted by a subscriber to the BS (e.g., applicable to subscriber-initiated cases), grouping config and/or maintenance commands transmitted by the BS to subscriber(s), grouping config and/or maintenance confirmations transmitted by the subscriber to the BS, etc.

The group config and/or maintenance control signals may be designed as a set of control messages with multiple action codes or as multiple sets of control messages, each for an action. For example, if a one set approach is used, the following set of control messages may be defined: Group-Config-REQ, Group-Config-CMD, and Group-Config-CFM.

To support different configuration operations, an action code may be included in a message definition. Examples of the actions may include: add, remove, and change. Multiple sets of control messages may be used. For each group configuration action, a set of control messages may be defined, e.g., Group-Add-REQ/CMD/CFM, Group-Remove-REQ/CMD/CFM, and Group-Change-REQ/CMD/CFM.

The group configuration and/or maintenance control signals may comprise information fields to communicate between the BS and the subscribers supporting the group based operations. For example, an MSG ID (e.g., M2M subscriber group identifier) to identify the group, a group usage indicator to support the proposed usage-specific grouping operations, a master subscriber(s) information field to provide information about the master subscriber(s) of the group if master subscriber(s) are used, etc.

A group usage indicator may be encoded as a bitmap field, where each bit corresponds to a specific group usage. For example, a 16-bit bitmap group usage indicator may be defined where: Bit 0 may be a group primary carrier change without master subscriber(s); Bit 1 may be a group primary carrier change with master subscriber(s); Bit 2 may be a group channel quality and/or status operation without master subscriber(s); Bit 3 may be a group channel quality and/or status operation with master subscriber(s); Bit 4 may be a group HO without master subscriber(s); Bit 5 may be a group HO with master subscriber(s); Bit 6 may be a group paging without master subscriber(s); Bit 7 may be a group paging with master subscriber(s); Bit 8 may be a group location update without master subscriber(s); Bit 9 may be a group location update with master subscriber(s); Bit 10 may be a DL multicast data traffic group; Bit 11 may be a group resource allocations; Bit 12 to 15 may be a reserved.

In the group usage indicator bitmap, some bits may be mutually exclusive to each other, e.g., the bits with or without master subscriber(s), while other bits may be set simultaneously in the same group, e.g., the bits for DL multicast data traffic and for channel link quality and/or status related operations.

There may be multiple variants in the group membership considerations in the group configuration and/or maintenance relation operations. Subscribers as group members may be the basic group membership. A service flow, which may be referred to as connections or logic links, of subscribers may be members of a group, e.g., for the group based resource allocation mechanisms supporting per-service-flow resource allocations. A set of subscribers or a subgroup of subscribers may be members of another group. In this case, a nested grouping or multi-level grouping may be supported. In order to facilitate the subscriber-initiated group configuration and/or maintenance operations, the BS may transmit control signals to the subscribers to announce grouping capabilities, group usages, currently active groups that the BS supports, etc.

Common in group operation is MS group membership may be multi-dimensional. For each of the group based operations above, an MS may belong to multiple groups at the same time. As an example, an MS group may be defined on the basis of ownership, traffic services provided, location, capabilities, etc. The network may need to take one or more of these factors into account when issuing a group command. For example, the network may want to issue a handover to a new RAT command to an MS that may belong to a certain owner, having the capability to do so, receive high data rate service and may be located near the new RAT. The network may want to issue a carrier switch command to each MS that belongs to another owner and is receiving certain traffic.

To maintain the flexibility described, several approaches may be taken. Simple grouping and simple commands may be used. A group may be defined for a certain purpose. The number of groups that are defined this way may become very large. As MS may change their conditions, their group membership may change, which may require unicast signaling to inform the MS of their new group membership. Simple grouping and compound (e.g., Boolean) commands may be used. Compound commands may be transmitted to apply to union or overlap of two or more such groups. Nested grouping and simple commands may be used. In nested grouping, a group may be defined as a sub-group of a parent group. For example, a group may be defined as comprising high data rate MS with a given ownership, and, that group may be given a unique ID. A hybrid approach may be used, where nested groups and compound commands are used.

Simple groups and simple commands may be a group management technique. An MS may be a member in a number of groups. Commands may be transmitted to one or more groups at a time and an MS may respond to a command if it recognizes one of its group ID's. A union of groups operation may be defined this way. To set up these groups, each value that a grouping category may take (e.g., operator A in the example) may need an ID. For example <ownership>={operator A} may be assigned ID-1 and <location>={near WLAN AP} ID-2.

Simple groups and compound commands may be defined and may be set as above. Commands may be defined on either the union or the intersection of groups. This is an extension of the capability of simple messaging to define a union of a group to the definition of intersection. The following exemplary syntaxes may be used for command:

<operation>((ID1, . . . IDn)<separator>(IDn+1, . . . , IDm))

which may imply that the operation is performed if MS is a member of the intersection of ID1, . . . IDn <or> the intersection of IDn+1, . . . , IDm. Resolvable Boolean expressions may be used (e.g., combinations of AND's and OR's), e.g., not limited to the above example.

For nested grouping a parent may need to be defined. A group may be nested in a parent group if membership in the child group implies membership in the parent group. The opposite may not be true. This may not require that each value of <parent> have nested groups. The following is an example:

Level 1: ID-1,1 ID-1,2
Level 2: ID-2,1 ID-2,2 ID-2,3 meaning that membership in 2,1 implies membership in 1,1.

For nested groups, a group ID for the parent group and a group ID for the nested (e.g., child) group may need to be defined. There may be no limit to the level nesting, but practical reasons may limit it to 2 or 3 levels. Commands that address the parent group may be assumed to address each of the child groups. To address ID-2,1 ID-2,2 in the example above it may be sufficient to address ID-1,1. In setting up groups, a change of parent may be broadcast and may not require individual signaling to each MS.

Contention-based access may be needed in scheduling based access networks in order to provide uplink (UL) access opportunities for subscribers who need UL access but do not expect UL allocations, e.g., initial network entry. However, contention-based access may have low resource utilization due to the nature of contentions. For example, for a ranging region allocation with n ranging slots, if there are m subscribers that are attempting to access the ranging region in a contention-based way, even when m<=n, there may still be collisions in some ranging slots and there may be some unused ranging slots.

For the cases where the base station (BS) has knowledge about UL network access demand, e.g., regarding who may need to transmit and when they may need to transmit, contention-based access may not be needed. Network resource utilization may be improved by eliminating contention-based accesses for such cases.

For current ranging channel use cases, for example in 802.16 systems, there may be cases where the BS has some knowledge about who may access the ranging channel and when they are expected to do so, particularly with Machine-to-Machine (M2M) applications. Examples of when the BS may have knowledge may include one or more of the following: group paging with network entry, ON/OFF UL traffic with known next-ON time and known next-to-connect BS information, periodic ranging for periodic link status monitoring and maintenance, and the like.

Systems, methods, and instrumentalities may be disclosed for improving ranging channel resource utilizations, e.g., for use cases where the BS has knowledge about ranging channel access demands. Ranging channel utilization enhancement mechanisms may provide non-contention based ranging channel access to subscribers whose ranging channel access demands are known to the BS. The BS may know who needs UL transmission opportunities and when, and, the BS may expect to use the ranging access channel to measure the required UL transmission parameter alignments, e.g., for a subscriber station (SS).

Unicast UL data region allocations may be provided to subscribers who have been inactive for some time and need UL transmission opportunities that are known to the BS, for example where no UL transmission parameter alignments are expected, (e.g., the SS may stay in UL synchronization with the BS). In this way, ranging channel access demands may be minimized. Such a unicast UL allocation may be referred to as a poll to a subscriber.

Use cases may include, but may not be limited to: ON/OFF UL traffic with known next-ON time and known "next-to-connect BS" (e.g., the BS that the SS may be expected to connect to during the next-ON period) before each OFF period, periodic link status monitoring and/or maintenance, group paging with network entry for fixed subscribers, and the like.

Control signaling procedures may be defined to support the non-contention based UL transmission opportunity assignment, e.g., for the identified use cases. For example, for ON/OFF UL traffic with known next-ON time and known next-to-connect BS, two variants of control signaling schemes may be: 1) a one-step approach, e.g., to signal the next-ON and/or next-to-connect BS information and assign the unicast UL transmission opportunity at a similar time (e.g., near in time); and 2) a two-step approach, e.g., to signal them at different times.

An operation mode, which may be referred to as an ON/OFF mode, may be defined to support subscribers with ON/OFF traffic patterns, e.g., subscribers with relatively long OFF periods. For periodic link status monitoring and/or maintenance, a BS may provide a unicast UL transmission opportunity to the subscriber. For group paging with network entry for fixed subscribers, a mapping scheme may be used to implicitly assign unicast UL transmission opportunities, e.g., dedicated ranging opportunities or unicast data channel allocations, to the subscribers in the paged group, which may improve control signaling efficiency.

A subscriber station (SS) in an access network may generally refer to a subscriber that is connected to a BS for communications, and it may be a fixed SS, WTRU, mobile SS (MS), Advanced Mobile SS (AMS) in 802.16/WiMAX systems, User Equipment (UE) in 3GPP systems, a non-AP station in an 802.11/WiFi system, etc. A BS may generally denote an access point, or called attachment point in the access network that connects the subscriber stations to the network. It may be a NodeB/eNB in 3GPP, BS/ABS in 802.16/WiMAX, a non-AP station in an 802.11/WiFi system, and the like.

An UL transmission opportunity may generally refer to an opportunity for a subscriber to transmit, which may include a ranging channel transmission, a data channel transmission, etc. Ranging may generally be referred to as a process used by subscribers to synchronize with the BS in UL and/or to initiate UL transmissions. It may be referred to as a random access procedure. It may be used by a subscriber to initially enter the network, to reenter the network from idle mode or handover (HO) or primary and/or anchor carrier change, to maintain UL synchronization, to request UL resource allocation, and the like.

A ranging channel may be generally referred to as a radio resource for a subscriber to transmit a ranging signal, e.g., NscH*NsBL in an orthogonal frequency-division multiple access (OFDMA) radio frame, where NscH may denote the number of subchannels and NsBL may denote the number of OFDMA symbols that may be used to carry the ranging signal. A ranging channel may be referred to as a ranging slot, random access channel, random access slot, etc. A ranging channel may be designed with different physical (PHY) structures from a regular UL data channel. It may generally carry less information and tolerate larger time and/or frequency offsets.

A ranging code may be a signal transmitted by a subscriber in a ranging slot. It may be referred to as a ranging preamble sequence, signature sequence, ranging CDMA code, random access sequence, random access code, and the like. A ranging opportunity may be an opportunity for subscribers to conduct ranging, which may comprise a ranging slot and a ranging code sent on the chosen ranging slot. It may be refired to as a random access opportunity.

The term "next-ON" may refer to the next ON state of a subscriber with ON/OFF traffic pattern at a given time reference point. The term "next-to-connect BS" may refer to the BS for a subscriber to connect to when the subscriber enters its next ON state.

Ranging channel utilization enhancement mechanisms may be provided, e.g., for the identified use cases, which may include control signal designs. Descriptions of the control signal designs may be given in the context of 802.16 air interface specifications, however, the mechanisms may apply to other scheduling based wireless access systems, e.g., 3GPP LTE and/or LTE-A, etc.

ON/OFF UL traffic may have known next-ON time and known next-to-connect BS. ON/OFF UL traffic may refer to a traffic pattern that has non-continuous UL traffic and alternates between ON periods and OFF periods. During an ON period a subscriber may transmit UL traffic and may receive DL traffic. During an OFF period, the subscriber may not need to be connected to the BS, e.g., an idle or other power saving mode.

With a known next-ON time and known next-to-connect BS, before entering an OFF state the current connected BS and the subscriber may know the next ON time and the BS to connect to for next ON period. The next-to-connect BS may be the currently connected BS or a different BS. For example, the currently connected BS may appliy to cases for fixed subscribers or subscribers moving within a cell, while a different BS may appliy to cases for cell reselection and HO with pre-known target BS. Examples of the above may include M2M devices (e.g., smart meters with fixed location) with periodic UL reporting traffic (e.g., 20 minutes) that may need to send a data packet to the M2M server connected in the network. Periodic UL data transportation for fixed M2M devices with periodic UL monitoring and/or reporting applications may be performed using a dedicated ranging opportunity or using unicast UL data channel allocation.

The reporting operations of M2M devices, (e.g., smart meters, concentrators, DAPs, etc), may be desynchronized for normal periodic monitoring and/or reporting and delay-tolerant data through, for example, base station (BS) coordination, M2M device self-control, or a hybrid approach. Desynchronize may refer to spacing UL traffic data transmissions in the available access network system resources for the periodic reporting operations of the M2M applications. The spacing may be uniform.

BS coordination may be used to desynchronize UL traffic data transmissions. This may be referred to as BS-coordinated desynchronized access. The BS may inform M2M devices when and/or how to conduct UL access with regard to M2M data reporting operations. Such information may be generated by the BS during its attempt to desynchronize UL access of the M2M devices within the delay-tolerance of the M2M applications.

The above methods may be applicable to other traffic modes such as ON/OFF traffic with known next-ON time as well as to UL periodic traffic. The fixed devices may be generalized to subscribers with known next-to-connect BS before each OFF period and the M2M devices may be generalized to subscribers in a scheduling based access network.

Figure 6:
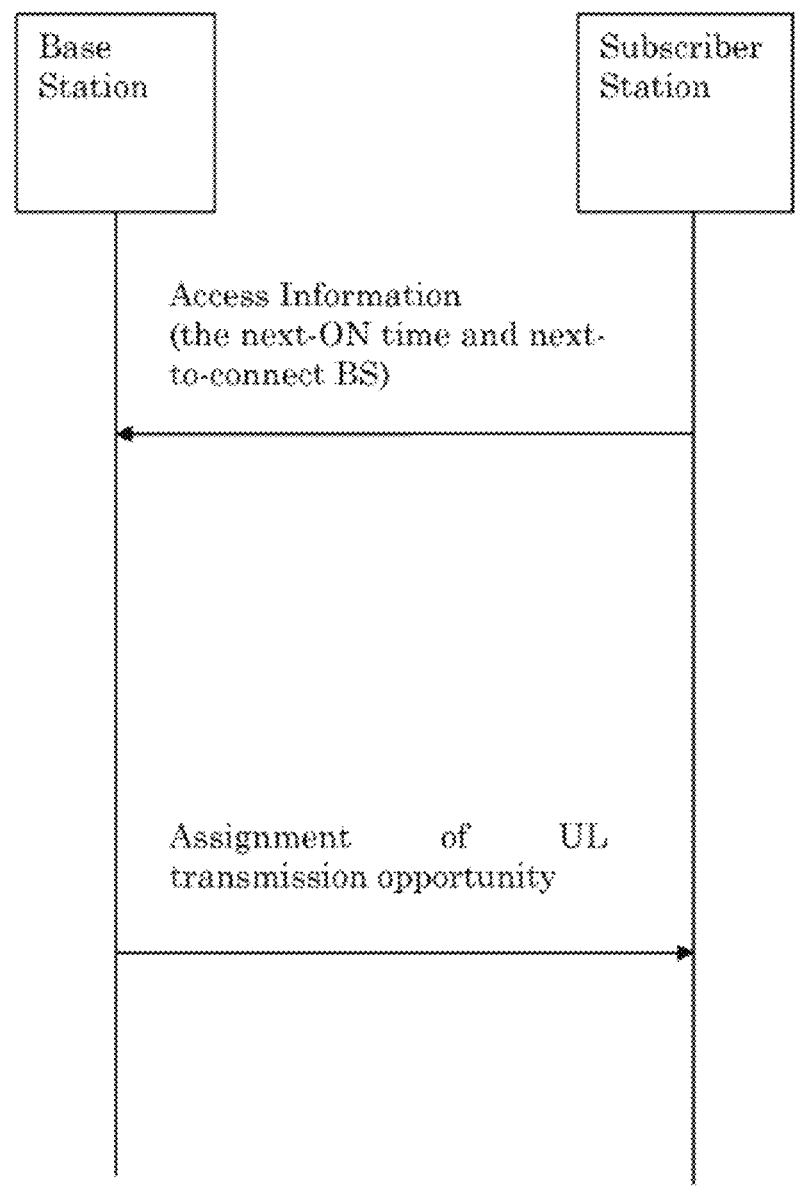
FIG. 6 illustrates an exemplary call flow between a base station and subscriber station.

Control signaling schemes for dedicated ranging opportunity assignment and unicast UL data channel allocation may be disclosed, which may include the one-step and two-step approaches disclosed herein. The one-step approach may refer to when synchronization and assignment is performed at the same time or close in time, e.g., before going to an OFF period. The current connected BS may sync up with the subscriber regarding the next-ON time and next-to-connect BS, and may assign a non-contention based UL transmission opportunity (e.g., a dedicated ranging opportunity or a unicast UL data channel allocation). In the two-step approach, synchronization and assignment may be performed at different times when the subscriber syncs up with the BS regarding its next-ON time and/or next-to-connect BS and when the subscriber is assigned a unicast UL transmission opportunity (e.g., dedicated ranging opportunity or unicast data channel allocation). FIG. 6 illustrates an exemplary call flow between a base station and subscriber station.

Described herein is a one-step approach for unicast UL transmission opportunity assignment. With the one-step approach, when a subscriber is in an ON state, e.g., connected with a BS before it enters OFF state, it may communicate with the BS with regard to the information of its next-ON time and next-to-connect BS. The BS may assign the subscriber a non-contention based UL transmission opportunity, which may be a dedicated ranging opportunity or a unicast UL data channel allocation. The communication about the next-ON and/or next-to-connect-BS information and the dedicated UL transmission opportunity assignment may occur at the same time or close in time, e.g., before the subscriber enters OFF state. When in an OFF state, the subscriber may not need to monitor the DL of the previous connected BS or the next-to-connect-BS, and, it may power down components to save power, e.g., that would perform such functions.

Before its negotiated next-ON time, a subscriber may start monitoring the downlink (DL) of the negotiated next-to-connect-BS, attempt to obtain DL synchronization with the BS, and attempt UL synchronization, e.g., so that the subscriber may be ready to transmit in the pre-assigned UL transmission opportunity or opportunities. The amount of time (e.g., in terms of number of superframes, radio frames, subframes, etc.) that may be needed for a subscriber to get ready to transmit at the pre-negotiated next-ON time may depend on implementation.

If the pre-assigned UL transmission opportunity is a unicast UL allocation at the negotiated next-ON time, the subscriber may attempt to maintain UL synchronization, e.g., as much as possible without transmitting in UL using contention-based access before the pre-assigned UL unicast allocation. In such a case, the UL synchronization may be maintained by the subscriber's monitoring and measuring of the DL, e.g., propagation delay, center frequency alignment for TDD systems, DL signal strengths, and the like, and/or the subscriber's previous knowledge about the air link with the given BS. Examples of control signaling designs to support the one-step approach may be provided below. The exemplary control signaling may be presented in terms of 802.16e, but are not limited to such implementations.

A two-step approach for unicast UL transmission opportunity assignment may be provided herein. With the two-step approach for unicast UL transmission opportunity assignment, the communication about next-ON and/or next-to-connect-BS information and the dedicated UL transmission opportunity assignment may occur in two stages, which may be at different times. During the (n−1)-th ON period, before going to the OFF state, the subscriber may communicate with the currently connected BS regarding its next-ON time and next-to-connect BS. Prior to the specified next-ON time, e.g., the subscriber's n-th ON time, the subscriber may perform one or more of the following: monitor the DL of the next-to-connect-BS, decode the DL resource allocation control signals, and look for the unicast UL transmission opportunity assignment, dedicated ranging opportunity, or unicast data channel allocation. If the subscriber finds a unicast UL transmission opportunity assignment, the subscriber may transmit in the UL at the UL transmission opportunity. Otherwise, the subscriber may continue to monitor and decode the DL control channels, e.g., until it obtains a unicast UL transmission opportunity assignment or reaches a pre-defined max waiting-window. If the maximum waiting-window has been reached and no unicast UL transmission opportunity is assigned, the subscriber may use contention-based UL access to initiate the network entry or reentry to the pre-assigned next-to-connect-BS or the subscriber may initiate a cell selection procedure to search for an appropriate BS to which to connect.

A difference between the two-step approach and the one-step approach may be at what time the unicast UL transmission opportunity assignment is informed and/or communicated to the subscriber. With the two-step approach, the unicast UL transmission opportunity assignment may be communicated at the n-th ON time by the serving BS of the n-th ON period. With the one-step approach, the opportunity may be communicated at the (n−1)-th ON period by the serving BS of the (n−1)-th period. The two-step approach may provide the n-th ON period BS more scheduling flexibility regarding the unicast UL transmission opportunity allocation. Examples of control signaling designs to support the proposed two-step approach may be discussed herein in the context of 802.16e, but are not limited to such implementations.

Control schemes may be presented in the 802.16e context to support the ranging channel utilization enhancement mechanisms for ON/OFF UL traffic pattern with known next-ON and known next-to-connect-BS. An exemplary scheme may use an operation mode, which may be referred to as an ON/OFF mode (OOM). An exemplary scheme may use existing 802.16e power saving operation mode(s), e.g., idle mode. Although the description given here is in the context of 802.16e systems, the schemes are applicable to other wireless communication networks. The control signals and/or control signaling mechanisms may be designed and/or implemented in different forms and/or at different levels, layers, or modules of, for example medium access control (MAC) control messages, MAC signaling headers/sub-header/extended headers, and the like, although the descriptions may be provided in the form of 802.16e MAC control and/or management messages.

The ON/OFF mode may be designed to allow subscribers with ON/OFF UL traffic patterns to transit from an OFF state into an ON state for UL traffic without using contention-based ranging channel accesses. This may be performed quickly and enable power savings. This mode may assist access networks to support a large number of subscribers with ON/OFF UL traffic patterns and with relatively long OFF periods, e.g., M2M applications with meters, sensors, and the like. The ON/OFF mode operation may comprise one or more of the following activities and/or stages: a) ON/OFF mode IDs; b) ON/OFF mode operation initiation; c) ON/OFF mode operation procedures and timing relevance; d) Pre-ON synchronization; e) ON-state resumption; f) ON-state data transportation; g) next-ON information communication; and h) ON/OFF mode operation termination.

ON/OFF mode IDs may be provided. An identifier may be used to uniquely identify a subscriber that supports ON/OFF mode in an access network. The identifier may be referred to as an ON/OFF mode ID or an ON/OFF ID (OOM-ID). The size of such an identifier may be smaller than the MAC address size, e.g., 48-bits, but it may be larger than the 802.16e connection identifier(CID) size, e.g., 16 bits. The introduction of such an identifier may be based on a trade-off between signaling efficiency and enough address space for a large number of subscribers. A possible size of this identifier may be 24 bits, 32 bits, or other number of bits between 16 bits and 48 bits. The ON/OFF ID may be unique within an access network that may be defined by network deployment, e.g., based on applications and/or ownership of the network. The access network may define the BS domain for the next-to-connect-BS parameter.

Described herein is ON/OFF mode operation initiation. After a subscriber enters the network and gets connected to a BS (e.g., after registration, authentication, and authorization procedures) the BS or the subscriber may initiate the ON/OFF mode operation. If the subscriber initiates, it may send a request message to the BS, e.g., OOM-REQ message, in which the subscriber may provide its suggestions about the ON/OFF mode operation parameters. The ON/OFF mode operation parameters may include one or more of the following: OFF start time; next-ON time; next-to-connect-BS, e.g., the BS ID indicating the BS to connect to for next-ON; ON/OFF ID (OOM-ID), e.g., a valid value if assigned previously, otherwise, using a pre-defined value, e.g., all 0s or all 1s, to indicate no previous assignment; next-ON UL transmission opportunity type, e.g., dedicated ranging opportunity (e.g., code+ranging slot) or unicast UL allocation; and next-ON UL transmission opportunity assignment approach, e.g., one-step vs. two-step.

When an OOM-REQ message from a subscriber is received, the BS may respond with an OOM-RSP message in which the BS may include one or more of the following: an ON/OFF ID assignment (e.g., if not assigned previously); a BS suggestion about the ON/OFF mode operation parameters, such as OFF start time, next-ON time, and the like, which may be a confirmation to the subscriber's suggestion or modifications within acceptable ranges of the subscriber; next-ON UL transmission opportunity type, e.g., dedicated ranging opportunity (e.g., code+ranging slot) or unicast UL allocation; next-ON UL transmission opportunity assignment approach, e.g., one-step vs. two-step; and if the one-step approach is used, the UL transmission opportunity assignment may be included in the OOM-RSP message.

When an OOM-RSP message from the BS is received, the subscriber may send a confirmation message, e.g., OOM-CFM, to the BS to confirm its acceptance of the OOM parameters given in the OOM-RSP message or to propose modifications to the OOM parameters given by the BS in OOM-RSP. If the BS receives an OOM-CFM message with OOM parameter modifications proposed by the subscriber, the BS may respond with another OOM-RSP message to the subscriber. Such a negotiation process may proceed until both sides reach an agreement, both sides decide to give up, etc. The OOM operation may be successfully initiated after the subscriber accepts the OOM parameters in the OOM-RSP message.

If the BS initiates OOM for a subscriber, the BS may send an unsolicited OOM-RSP message to the subscriber with the BS's suggestions about the OOM parameters. If the subscriber receives an unsolicited OOM-RSP, the subscriber may respond with an OOM-CFM message, e.g., following the same negotiation process as described above.

At ON/OFF mode operation initiation, if the current serving BS is not the next-to-connect-BS, the current serving BS may be responsible to communicate with the next-to-connect-BS regarding the next-ON time, the non-contention based UL opportunity assignment, the OOM ID assignment, its associated connection context, etc.

ON/OFF mode operation procedures and time relevance may be disclosed. When the ON/OFF mode operation is initiated, the subscriber may enter its ON/OFF mode operation. At the negotiated OFF start-time, the subscriber may go to OFF. The BS may keep the registration and/or security information of the subscriber, and keep the context of its connections, (e.g., connection scheduling service type, QoS parameters, SA associations, and the like). The BS may release the CIDs for other uses.

At the OFF start time as negotiated during ON/OFF mode operation initiation, the subscriber may enter the OFF state, where the subscriber is not available at the air interface to the previous serving BS and the next-to-connect-BS, which may be the same BS. The subscriber may power down the relevant components to save power.

Figure 7:
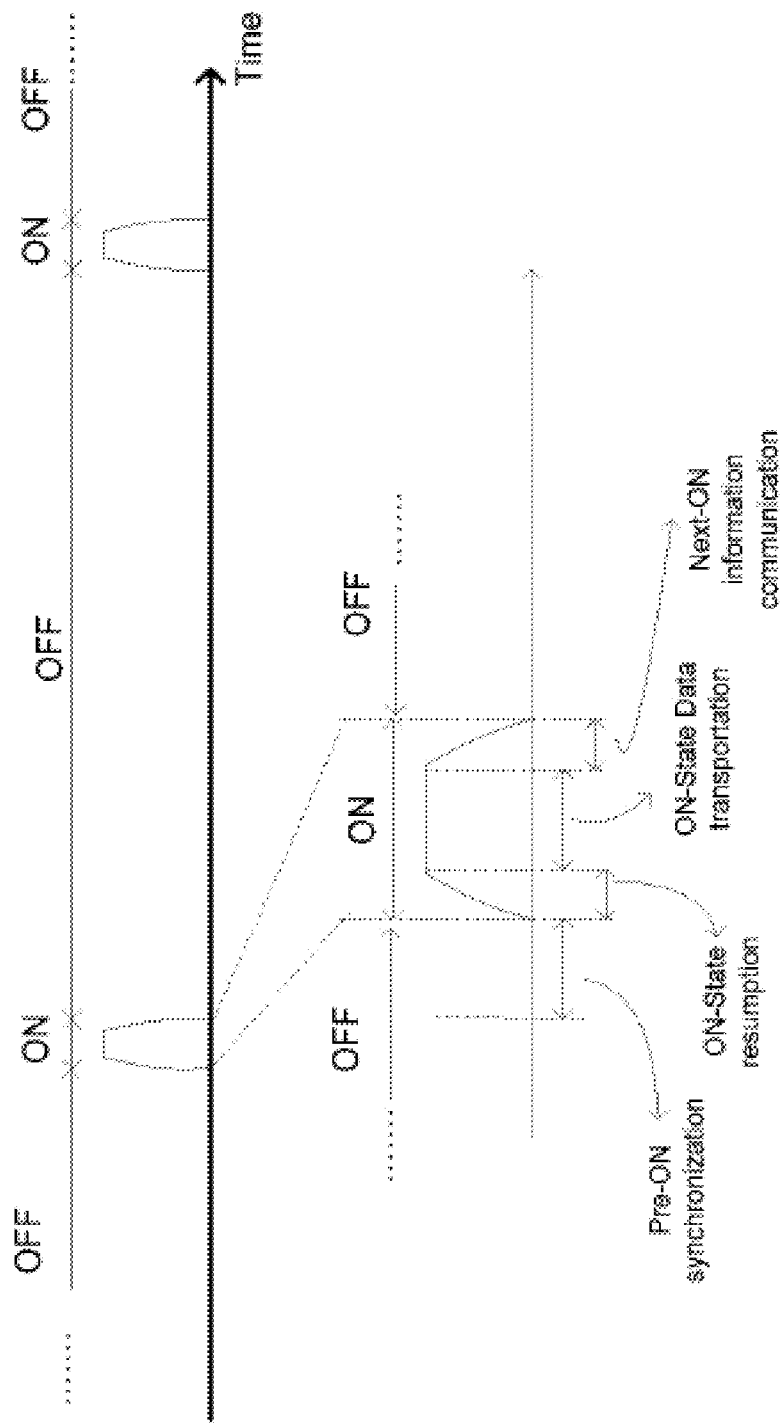
FIG. 7 illustrates exemplary ON/OFF mode operation and timing.

The ON/OFF mode operation may use component procedures. These may include one or more of the following: a) pre-ON synchronization; b) ON-state resumption; c) ON-state data transportation and d) next-ON information communication. FIG. 7 illustrates exemplary ON/OFF mode operation and timing.

Pre-ON synchronization may be disclosed. Pre-ON synchronization may refer to the procedure that a subscriber in an OFF state uses to get ready for its next-ON. Before its negotiated next-ON time, the subscriber may start monitoring the DL of the negotiated next-to-connect-BS and may attempt to obtain DL synchronization with the BS and UL synchronization, so that the subscriber may be ready to transmit in the pre-assigned UL transmission opportunity or opportunities. The amount of time needed for a subscriber to get ready to transmit at the pre-negotiated next-ON time may be denoted as $T_{pre-ON-sync}$. It may be implementation specific. $T_{pre-ON-sync}$ may need to accommodate one or more of: a possible clock drifting at the subscriber, the time needed to re-obtain synchronization with the BS, etc. The subscriber clock drifting may cause gaps between the next-ON time and the time to re-obtain synchronization. In this case, the subscriber may go back to OFF again, e.g., for power saving purpose, and come back again at an later time.

ON-state resumption may be provided. At the negotiated next-ON time, an ON-state resumption procedure may be performed for the subscriber to get ready for data transportation. If the one-step approach is used, e.g., a non-contention-based UL transmission opportunity was assigned previously, the subscriber may use the previously assigned UL opportunity to send an UL signal to the BS to initiate the ON-state resumption process. If the two-step approach is used, e.g., no non-contention-based UL transmission opportunity was assigned previously, the subscriber may keep monitoring and/or decoding the DL for the UL resource allocation signals until it obtains a non-contention-based UL transmission opportunity, for example a dedicated ranging opportunity (e.g., code+ranging slot) or unicast UL data region allocation. The subscriber may use the allocated non-contention-based UL opportunity to send UL signals to initiate the ON-state resumption process.

With the two-step approach, the UL resource assignment control signals may be in one or more of the following: a UL MAP Information Element (IE), which may be a modified and/or extended IE, a DL control message, a control and/or signaling header, a subheader, and extended header, where the subscriber may be identified by its OOM ID. The BS may use one resource assignment control signal (e.g., a MAP IE, control message, signaling header, and the like) to assign non-contention-based UL transmission opportunities to multiple ON/OFF mode subscribers. In this case, if the assigned UL resource type is a dedicated ranging opportunity, which may include a ranging code and ranging slot, then a dedicated ranging region with one or multiple ranging slots may be allocated. The ranging opportunities in the ranging region may be assigned to subscribers in a unicast manner. If the assigned UL resource type is a unicast UL data region allocation, the BS may specify a data region allocation for the multiple subscribers and then assign each subscriber a unicast sub-allocation.

When using one UL resource assignment control signal, (e.g., MAP IE, control message, signaling header, and the like), to assign UL resources to multiple ON/OFF mode subscribers, the mapping between multiple OOM IDs to the UL resources may be implicitly specified by pre-defined mapping algorithms, e.g., certain ordering and/or numbering mechanisms of the UL resource allocations and ON/OFF mode subscribers. For example, dedicated ranging region allocations may be specified by numbering the ranging opportunities and mapping them to the list of OOM IDs.

When the subscriber obtains a non-contention-based UL resource allocation at or after the pre-negotiated next-ON time, the subscriber may use the given UL allocation to transmit a UL signal, ranging code or UL MAC packet data unit (PDU), to the BS. The BS may respond to the subscriber with one or more of the following: further UL resource allocations; control signals for security checking; and control signals to restore the connection context, which may include one or more of the following: assigning connection IDs, mapping the connection IDs to the pre-stored connection settings, e.g., QoS parameters, security associations, and the like.

A connection context restoration scheme may re-establish the connections for an OOM subscriber transitioning from OFF to ON. For an OOM subscriber, its connection context may include one or more of the following: an OOM ID; a list of connections such as <connection-a, QoS parameter settings; security association settings, . . . >
    <connection-b, QoS parameter settings; security association settings, . . . >
    . . .
    <connection-xyz, QoS parameter settings; security association settings, . . . >;

other descriptors of the subscriber, e.g., fixed vs. mobile, and the like.

The term "connection-a" may be an internal identifier specific to the subscriber. When in an ON state, the connection-a may be mapped to a connection ID (CID) assigned by the BS. When in an OFF state, there may be no valid CIDs assigned for the subscriber. With the connection context restoration scheme, instead of going through the connection establishment procedures with DSx messages, the connections may be restored by mapping the newly assigned CIDs to the previously stored connection context. For connection-a, the QoS, security, etc., may be restored using the values associated with the connection-a user.

After restoring the previously-stored connection context, the subscriber and/or the BS may create or modify existing connections in order to support the needed data communications, for example through the normal connection management procedures, e.g., DSx messages and/or procedures defined in 802.16e specifications and other similar specifications. Once the connections have been successfully (re-) established, the ON-state resumption may be completed, and, the subscriber may start the data transportation with the BS.

An ON-state data transportation may be provided. At the stage of ON-state data transportation, the BS and the subscriber may communicate with each other for data transportation, e.g., as in connected-mode operation.

A next-ON information communication may be provided. After completing ON-state data transportation, the subscriber and the BS may communicate with each other regarding the next-ON information. The next-ON time and next-to-connect-BS information may be derived based on one or more of the following: the subscriber's traffic pattern characteristics, expected movement, and the access network and/or BSs's traffic loadings and resource availabilities. To support a larger number of subscribers for M2M applications, the network access desynchronization mechanisms discussed herein may be used to balance the network traffic load and to avoid network congestion.

The reporting operations of M2M devices (e.g., smart meters, concentrators, DAPs, etc.) may be desynchronized with normal periodic monitoring and/or reporting and delay-tolerant data through base station (BS) coordination and/or M2M device self-control. Desynchronize may refer to spacing UL traffic data transmissions in the available access network system resources for the periodic reporting operations of the M2M applications. The spacing may be uniform.

BS coordination may be used to desynchronize UL traffic data transmissions. This may be referred to as BS-coordinated desynchronized access. The BS may inform M2M devices when or how to conduct UL access with regard to M2M data reporting operations. Such information may be generated by the BS during its attempt to desynchronize M2M devices' UL access within the delay-tolerance of the M2M applications.

The next-ON information communication procedure may be similar to the ON/OFF mode operation initialization procedure, where the BS and the subscriber negotiate and/or agree on the next-OFF start-time and the next-ON parameters. Such parameters may include one or more of the following: next-ON time, next-to-connect-BS, next-ON UL transmission opportunity type, next-ON UL resource assignment, e.g., if one-step approach is used, and the like. ON/OFF mode operation may support a large number of subscribers with ON/OFF UL traffic patterns and with relative long OFF periods, e.g., M2M applications with meters, sensors, and the like. The relatively long OFF periods may make this mechanism useful for use cases where the OFF periods are minutes, tens of minutes, and up to few hours, e.g., periods much longer than current existing power saving modes may be able to support.

An OFF period may be determined by:

$$T_{OFF} = t_{Next-ON} - t_{OFF-Start} - T_{pre-ON-sync} \quad \text{Equation (1)}$$

where $t_{Next-ON}$ may refer to the Next-ON time, $t_{OFF-Start}$ may refer to the OFF starting time, and $T_{pre-ON-sync}$ may refer to the time needed for pre-ON synchronization. Note that $t_{OFF-Start}$ may be expected to be relatively small, e.g., less than 10 frames, as it is negotiated before the subscriber goes to OFF state. $T_{pre-oN-sync}$ may be expected to be relatively small, e.g., tens of frames. The maximum OFF period may depend on the maximum $t_{Next-ON}$ value that may be supported. The maximum $t_{Next-ON}$ value that may be supported by an access network (e.g., 802.16e) may depend on one or more of the following: 1) the max frame sequence number (e.g., the size of the frame sequence number field); and 2) the subscriber clock accuracy.

In 802.16e as specified by 802.16-2009 standard, a 24-bit frame number (FN) field may be transmitted in the DL MAP message, e.g., in each 5-ms radio frame. For example, the 24-bit FN field may provide the time interval of 16*1024*1024*5 ms, e.g., 23.30169 hours for the FN to wrap-around.

If considering that the subscriber clock accuracy may be about 2 to 5 ppm, then clock drifts may be up to 419.43 ms, e.g., about 84 frames (e.g., 5 ms-frames), during the 24-bit FN wrap-around interval. The clock drifting may happen on both sides, e.g., too-fast or too-slow. The maximum clock drifting window size may be about 2*84=168 frames, e.g., about 840 ms. The maximum $t_{Next-ON}$ value may be derived as (16*1024*1024-168) frames, e.g., 23.30146 hours. This maximum $t_{Next-ON}$ value may provide sufficient coverage to the OFF periods, e.g., as seen in typical ON/OFF M2M traffic patterns.

ON/OFF mode operation termination may be provided. The BS or the subscriber may terminate ON/OFF mode operation. ON/OFF mode operation termination may be done implicitly and/or explicitly. The ON/OFF mode operation may implicitly terminate in one or more of the following situations: there is no next-ON information communication in an ON period; and, the subscriber leaves the access network explicitly through a deregistration process or implicitly by not showing up at a negotiated next-ON and/or next-to-connect-BS.

ON/OFF mode operation may explicitly terminate in one or more of the following situations: the subscriber initiates the termination process by sending a control signal, e.g., a OOM-END-REQ MAC control message to the BS; the BS responds with an OOM-END-RSP MAC control message; and the BS initiates the termination process by sending an unsolicited OOM-END-RSP message and the subscriber responds with a confirmation message, e.g., OOM-END-CFM.

Information fields in ON/OFF mode operation termination control signals, e.g., OOM-END-REQ/RSP/CFM messages, may include the subscriber's OOM ID and other field(s), e.g., reason-for-termination, and the like. Once the ON/OFF operation mode terminates for a subscriber, the BS may release the OOM ID assignment and its associated connection context. The BS may communicate with the access network, e.g., other BSs and/or other control entities, to make sure the OOM ID and its associated connection context may be released.

802.16e idle mode operation mechanisms may be provided. In 802.16e, as specified in 802.16-2009, power saving modes such as sleep mode and idle mode may be used to support subscribers with ON/OFF traffic patterns. The 802.16e sleep mode operation may support relatively short sleep periods, e.g., OFF periods. It may be up to 1K 5 ms-frames, e.g., about 5.1 seconds. Such short OFF periods may not fit well with use cases of the ON/OFF UL traffic patterns with relatively long OFF periods, (e g, minutes, tens of minutes, and up to few hours).

802.16e idle mode operation may support a paging cycle up to 64K 5 ms-frames, e.g., up to 5.461 minutes. A paging cycle may comprise a 1 to 5 frame paging interval and the remaining frames may be an unavailable interval, where unavailable refer to the subscriber as not being available to the access network at the air interface. For example, the current 802.16e idle mode operation may support OFF periods up to 5.46 minutes. The 802.16e idle mode with or without modifications may be used to support the use cases of ON/OFF UL traffic patterns, e.g., where the ranging channel utilization enhancement mechanism may be applied.

During a paging cycle, the paging message may be transmitted by the BS during the paging interval to inform the idle mode subscriber if it needs to reenter the network, e.g., for pending DL traffic, location update, and the like. It may have two attributes, periodic and DL-traffic notification.

The mechanisms discussed above may be directed to ON/OFF UL traffic patterns, and may not be limited to periodical traffic. When using the 802.16 idle mode operation to support efficient ranging channel access mechanisms for the subscriber with ON/OFF UL traffic with known next-ON time and next-to-connect-BS information, the considerations below may need to be taken into account. For example, a consideration may be that periodic UL traffic may be treated as a special case of ON/OFF UL traffic patterns.

The coordinates between the paging cycle and UL-traffic periodicity may need to be considered. For example, if UL-periodicity <=paging cycle, then there may be procedures for supporting efficient ranging channel access mechanisms. The paging cycle may be matched to UL periodicity and the paging message may be used to assign a dedicated ranging opportunity for the subscriber to re-enter the network with non-contention-based ranging channel access. Periodical dedicated ranging opportunities may be assigned based on the UL-periodicity and a separate paging interval may not be provided during the idle mode, e.g., there may be an "ON" period during a paging cycle to be used to transmit DL traffic pending notification. If UL-periodicity>paging cycle, for a delay-tolerant application, UL traffic may be deferred until a next paging interval. If there may be knowledge of pending UL traffic for a paging interval, dedicated ranging opportunity assignment may be provided in the paging message, e.g., so that the subscriber may re-enter the network in a non-contention based access way.

Modifications may be used in idle mode operation, e.g., to extend the paging cycle to accommodate longer OFF periods by having a larger paging cycle information field in the relevant control signals, having different units for current information fields, e.g., changing the unit from one frame to two frames, and the like.

Periodic link status monitoring and/or maintenance may be provided. In connected mode, periodic ranging and/or coverage loss detection procedures may be used to monitor and maintain the air link.

In current 802.16e and 802.16m specifications, periodic ranging (PR) may be performed by subscribers using contention-based access to send PR codes in ranging channels. Issues with these procedures may include one or more of the following: low ranging channel utilization due to contention-based access, and the BS may not know the subscriber ID information in the PR procedure, e.g., the PR procedure may be disconnected with other link status monitoring and/or maintenance mechanisms, such as coverage loss detection.

Procedures may be provided to address these issues. PR opportunities may be selected based on STID instead of randomly. The BS may be allowed to maintain the periodic timer and govern the periodic ranging process, e.g., to minimize the need for periodic ranging channel access and provide dedicated ranging opportunities.

A dedicated ranging may be an initial ranging that may be used to establish the ranging process when the ranging is performed initially as part of a procedure, such as location determination, coordinated association during scanning, location update in idle mode, etc. For a dedicated ranging, the BS may provide dedicated ranging information and allocate the dedicated ranging region at a pre-defined rendezvous time, e.g., in terms of relative frame number.

Dedicated periodic ranging opportunity assignment control signals may be provided. 802.16e may be used as the context for the descriptions, however, the mechanisms may apply to other access networks, e.g., 802.16m systems, 3GPP LTE and/or LTE-A systems, etc.

When the BS considers that periodic ranging (PR) is needed for a subscriber or a group of subscribers, the BS may allocate a PR region with one or multiple PR slots (e.g., channels). The PR slots may be numbered in a numbering scheme, e.g., as described in section 8.4.7. in IEEE 802.16- 2009, "Part 16: Air Interface for Broadband Wireless Access Systems," March 2009. For example, there may be n PR slots in the allocated PR region, numbered as $\{S_0, S_1, \ldots, S_{n-1}\}$. A set of PR codes or PR preamble sequences may be identified, e.g., denoted as PR-code-set=$\{C_0, C_1, \ldots, C_{m-1}\}$, where the codes may be received and decoded by the BS, e.g., when transmitted in the PR slot. The number of codes, m, may be implementation specific, and may be a number between 1 and the number of allowed PR codes.

The periodic ranging opportunities (PROs) may be identified by a combination of a slot and a PR code. They may be numbered by numbering schemes. For example, a slot-first numbering scheme or a code-first numbering scheme may be used. A slot-first numbering scheme may be:

$$PRO_0 = (S_0, C_0); PRO_1 = (S_1, C_0); \ldots ; PRO_{n-1} = (S_{n-1}, C_0);$$

$$PRO_n = (S_0, C_1); PRO_{n+1} = (S_1, C_1); \ldots ; PRO2_{n-1} = (S_{n-1}, C_1);$$

...

$$PRO_{(m-1)n} = (S_0, C_{m-1}); PRO(_{m-1})_{n+1}(S_1, C_{m-1}); \ldots ;$$

$$PRO_{mn-1} = (S_n-1, C_{m-1}).$$

A code-first numbering scheme may be:

$$PRO_0 = (S_0, C_0); PRO_1 = (S_0, C_1); \ldots ; PRO_{m-1} = (S_0, C_{m-1});$$

$$PRO_m = (S_1, C_0); PRO_{m+1} = (S_1, C_1); \ldots ;$$

$$PRO_{m-1} = (S_1, C_{m-1});$$

...

$$PRO_{(n-1)m} = (S_{n-1}, C_0); PRO_{(n-1)m+1} = (S_{n-1}, C_1); \ldots ;$$

$$PRO_{nm-1} = (S_{n-1}, C_{m-1}).$$

The number of codes in the PR slots may be different, in which case the above example PRO numbering schemes may be modified. With a given numbering scheme, the PROs may be generally represented by an ordering list as follows:

$$PRO\_list=\{PRO_0, PRO_1, \ldots, PRO_{p-1}\}.$$

The PRO ordering list may be pre-defined, e.g., there may be no need to signal it each time the dedicated PR opportunities assignment is used.

When the BS assigns the dedicated PR opportunities to subscribers, it may list subscriber IDs, e.g., basic CIDs in 802.16e, in the PRO assignment signal and may provide the PR region allocation or reference to a PR region allocation. The assignment may be implicitly performed through a mapping from the list the subscribers to the PRO list of the given PR region allocation. In order to provide non-contention-based PR channel access, the number of subscribers in the subscriber list may not be more than the number of PR opportunities in the PRO list. The subscriber-to-POR mapping may not have more than one subscriber mapped into the same PR opportunity. Example mapping algorithms may include one or more of the following: map the subscriber list to the PRO list in the same order, in the opposite order, in the order of odd-number first or even-number first, other pre-defined permutation algorithms, etc. The assignment signal may be a MAP IE, an extended MAP IE, a MAC control message, a control and/or signaling header, a sub-header, an extended header, or the like.

Group paging with network entry may be provided. The group paging with network entry may refer to an idle mode operation scheme, with which the idle mode subscribers are grouped, e.g., based on certain criteria. During the paging interval, the BS may page the group of subscribers by using a group ID and request them to enter the network. A typical use case for the group paging scheme may be for fixed M2M devices grouped based on particular M2M application attributes. Since the BS may have the knowledge of the group members, the group paging with network entry may be an example where the BS may know who needs to enter the network and when. It may be a use case of the non-contention ranging channel access scheme, e.g., for subscriber groups with fixed M2M devices. For a large group, the BS may allocate several smaller ranging regions for the group. Members of the group may select ranging opportunities in the allocated ranging regions based on a parameter, e.g., basic CID, STID, etc.

In a group paging message, the subscribers in the paged group may not be listed individually. The Group ID may be used to identify the group as whole. It may be a challenge to efficiently signal the dedicated UL transmission opportunity, e.g., ranging channel opportunity or UL data channel allocation, to each subscriber in the paged group. It may not be an option to list each of the subscribers in the paged group in the paging message to assign dedicated UL transmission, for example it may defeats the purpose of group paging, e.g., paging the group by using the Group ID instead of listing each of the member subscribers.

A mapping mechanism may be used to map the subscribers in a paged group to the UL transmission opportunities allocated for the paged group. An UL transmission opportunity may be a dedicated ranging channel opportunity, a unicast UL data channel allocation, etc. It may comprise one or more of the following: numbering and/or ordering the UL transmission opportunities allocated for the paged group; numbering and/or ordering the subscribers in the paged group; and, mapping the subscribers to the UL transmission opportunities.

A numbering and/or ordering scheme used for the UL transmission opportunities may be provided. The UL transmission opportunities may be numbered by using a pre-defined numbering scheme. For example, if the UL transmission opportunities are ranging opportunities in a ranging channel allocation, the numbering schemes described herein may be used to put the allocated ranging opportunities into an ordered list.

If the UL transmission opportunities are a unicast UL data region allocation, the description may describe a fixed-size UL data allocation for the group of subscribers. Variable-size data allocation may be performed, which may need more complicated control signals. For a given data region allocation for a group of paged subscribers in group paging, the data region allocation may be logically divided into fixed-size sub-allocations, e.g., each sub-allocation for one subscriber to transmit. The sub-allocations may be numbered in a pre-defined numbering and/or ordering scheme, e.g., time-domain first, frequency-domain first, or the like.

A numbering and/or ordering scheme used for the subscribers may be provided. A numeric value may be assigned to a subscriber in a subscriber group, which may be referred to as an in-group ID, that may uniquely identify a subscriber within the domain of the group. It may be assigned by the BS to the subscriber at the time that the subscriber is configured as member of the subscriber group. It may be changed by the BS through a hand-shaking procedure with the subscriber. The in-group ID assignment and change procedures may be implemented by introducing an in-group ID information field in the group configuration and/or change control signals, e.g., GROUP-Config-REQ/CMD/CFM messages. This may be a set of operations based on groups of nodes. Nodes may be grouped, for example, based on functionality, location (e.g., including a group moving together, such as in a truck), etc., and the group of nodes may be controlled (e.g. primary carrier change) using a group ID.

The in-group ID values may be in the domain of [0, 1, 2, . . . , n−1], where n is the number of subscribers in the subscriber group. The in-group ID of a subscriber may determine its ordering position in the group. The use of the in-group IDs may allow the subscribers to be logically ordered in a list.

When a subscriber is added to or removed from group, the BS may be responsible for maintaining the in-group ID assignments, e.g., in a continuous integer number domain. For example, if a subscriber with a middle in-group ID leaves the group, the BS may take actions to fill in the gap in the in-group ID list, e.g., by moving the last subscriber to the gap position by using the group configuration control signals.

Mapping the subscriber list to the UL transmission opportunity list may be provided. With the group paging mechanism, the subscriber group may be paged by its group ID. If network entry is needed, the BS may allocate UL transmission opportunities for the subscribers to enter the network. With the above numbering mechanisms for the UL transmission opportunities and the subscribers in the group, the subscribers may be mapped to the allocated UL transmission opportunities, e.g., so that the subscribers may enter the network in a non-contention based way.

Similar to the periodic ranging opportunity mapping described herein, in order to provide non-contention-based UL access, the number of subscribers in the subscriber group may not be more than the number of the allocated UL transmission opportunities, e.g., the mapping may not have more than one subscriber mapped into the same UL transmission opportunity. Example mapping algorithms may map the subscriber list to the UL transmission opportunity list in the same order, in the opposite order, in the order of odd-number first or even-number first, other pre-defined permutation algorithms, etc.

The mapping mechanism for UL transmission opportunity allocation for the paged group may be applied to 802.11/WiFi based WLAN (Wireless LAN) access systems. For example, the TIM (traffic indication message) element may be used as the paging message to indicate the existence of buffered DL BUs (bufferable units), and, the PSMP (power saving multi-poll) scheme may be used to allocate UL transmission opportunities, e.g., UTTs (UL transmission times), to the paged stations. When using a combination of TIM and PSMP, an information indicator may be added to the TIM. For example, the indicator may inform paged stations not to use a 802.11 channel access mechanism to send their DL delivery requests, e.g., PS-Polls. Paged stations may wait for UTT allocations given by the PSMP scheme. In this case, the paged group may be defined by the stations with positive DL traffic indications in a TIM, e.g., the is of corresponding bits in a partial virtual bitmap in the TIM, where the order of the paged stations is the order of their bitmap position. The assigned UL transmission opportunities, e.g., the UTTs, may be specified in the PSMP frame, where the order of the assigned UTTs may be the order of the assignments in the PSMP frame. With the proposed mapping mechanism, the paged stations in the TIM may be assigned with the UTTs in the PSMP by mapping in the order from the ordered station list to the ordered UTT list. The TIM element may comprise the positive traffic indications to the stations that may be provided UL transmission opportunities in the PSMP frame following the TIM, such that the size of the TIM element may be effectively reduced. This may result in a more efficient TIM element encoding and transmission. In the paged stations to allocated UTTs mapping mechanism, the PSMP frame encoding may be improved by not listing the AIDs (Associated IDs) for the stations as the recipients of the UTTs, e.g., the recipient stations may be identified by the TIM prior to the PSMP frame.

The UTT allocation may be provided by multiple PSMP frames and/or sequences. In this case, the numbering and/or ordering of the UL transmission opportunities may be given in a concatenated manner crossing the multiple PSMP frames and/or sequences, e.g., in the order of PSMP frame transmissions. For example, if three PSMP frames are used to provide UTT allocations to N stations paged in one TIM, with n1, n2, and n3 UTTs, respectively, and n1+n2+n3=N, the UTTs in the first PSMP frame may be numbered from 0 to n1−1. The UTTs in the second PSMP frame may be numbered from n1 to (n1+n2−1). The UTTs in the third PSMP frame may be numbered from (n1+n2) to N−1.

Backward compatible implementations may be provided. When introducing ranging channel utilization mechanisms to existing wireless access systems, e.g., 802.16e, legacy subscribers may not choose the ranging opportunities that are assigned to specific subscribers as described herein. In order to provide dedicated ranging opportunities that result in non-contention-based access to the intended subscribers, one or more of the following may be used: use a separate ranging region, e.g., using the dedicated ranging indicator in the UL MAP IE in 802.16e; introduce a separate UL interval usage code (UICU); introduce MAP IEs or extended IEs; and introduce new separate control signals, e.g., messages, signaling headers, subheaders, extended headers, etc. The schemes may prevent legacy users from using the ranging region allocation and make the legacy subscribers skip the introduced messages and the allocated separate ranging channels.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method to desynchronize an uplink transmission, the method comprising:
   selecting, by a user equipment (UE) in an inactive mode, a transmission window in which to send an uplink transmission to a network when entering an active mode, wherein selecting the transmission window is based on a reporting periodicity and a delay tolerance;
   generating, by the UE, a random transmission time within the transmission window at which to send the uplink transmission, wherein generating the random transmission time is based on a first identifier associated with the UE; and
   sending, by the UE, the uplink transmission to the network at the random transmission time, wherein the uplink transmission is desynchronized relative to respective uplink transmissions sent from other UEs.

2. The method of claim 1, wherein the first identifier comprises a device identifier of the UE.

3. The method of claim 1, wherein selecting the transmission window is further based on the first identifier.

4. The method of claim 1, wherein generating the random transmission time is further based on a second identifier associated with the UE.

5. The method of claim 4, wherein the first identifier comprises a device identifier of the UE, and wherein the second identifier comprises a group identifier assigned to the UE by a device in the network.

6. The method of claim 5, wherein selecting the transmission window is further based on at least one of the first identifier or the second identifier.

7. The method of claim 1, further comprising:
   aggregating, by the UE, a plurality of data samples; and
   transmitting the plurality of data samples in the uplink transmission.

8. A user equipment (UE) that is configured to desynchronize an uplink transmission, the UE comprising:
   a processor; and
   a memory comprising instructions that when executed by the processor cause the UE to:
      while in an inactive mode, select a transmission window in which to send an uplink transmission to a network when entering an active mode, wherein the transmission window is selected based on a reporting periodicity and a delay tolerance;
      generate a random transmission time within the transmission window at which to send the uplink transmission, wherein the random transmission time is generated based on a first identifier associated with the UE; and
      send the uplink transmission to the network at the random transmission time, wherein the uplink transmission is desynchronized relative to respective uplink transmissions sent from other UEs.

9. The UE of claim 8, wherein the first identifier comprises a device identifier of the UE.

10. The UE of claim 8, wherein selection of the transmission window is further based on the first identifier.

11. The UE of claim 8, wherein generation of the random transmission time is further based on a second identifier associated with the UE.

12. The UE of claim 11, wherein the first identifier comprises a device identifier of the UE, and wherein the second identifier comprises a group identifier assigned to the UE by a device in the network.

13. The UE of claim 12, wherein selection of the transmission window is further based on at least one of the first identifier or the second identifier.

14. The UE of claim 8, wherein the instructions, when executed by the processor, further cause the UE to:
   aggregate a plurality of data samples; and
   transmit the plurality of data samples in the uplink transmission.

15. A method to desynchronize an uplink transmission, the method comprising:
   receiving, by a user equipment (UE) in an inactive mode, an indication of a plurality of transmission windows in which an uplink transmission can be sent to a network when the UE enters an active mode;
   selecting, by the UE, a particular transmission window of the plurality of transmission windows in which to send the uplink transmission, wherein selecting the particular transmission window is based on an identifier associated with the UE;
   selecting, by the UE, a random transmission time within the particular transmission window at which to send the uplink transmission; and
   sending, by the UE, the uplink transmission to the network at the random transmission time, wherein the uplink transmission is desynchronized relative to respective uplink transmissions sent from other UEs.

16. The method of claim 15, wherein the indication comprises a list of time offsets that correspond to respective beginnings and ends of each of the plurality of transmission windows.

17. The method of claim 15, wherein the identifier is at least one of a MAC address, an IP address, or an association identifier (AID) of the UE.

18. The method of claim 15, further comprising mapping, by the UE, the identifier into the particular transmission window.

19. A user equipment (UE) that is configured to desynchronize an uplink transmission, the UE comprising:
   a processor; and
   a memory comprising instructions that when executed by the processor cause the UE to, upon receiving, while in an inactive mode, an indication of a plurality of transmission windows in which an uplink transmission can be sent to a network when the UE enters an active mode:
      select a particular transmission window of the plurality of transmission windows in which to send the uplink transmission, wherein the particular transmission window is selected based on an identifier associated with the UE;
      select a random transmission time within the particular transmission window at which to send the uplink transmission; and
      send the uplink transmission to the network at the random transmission time, wherein the uplink transmission is desynchronized relative to respective uplink transmissions sent from other UEs.

20. The UE of claim 19, wherein the indication comprises a list of time offsets that correspond to respective beginnings and an ends of each of the plurality of transmission windows.

21. The UE of claim 19, wherein the identifier is at least one of a MAC address, an IP address, or an association identifier (AID) of the UE.

22. The UE of claim 19, wherein the instructions, when executed by the processor, further cause the UE to map the identifier into the particular transmission window.

* * * * *